United States Patent
Buezas et al.

(10) Patent No.: US 10,121,176 B2
(45) Date of Patent: Nov. 6, 2018

(54) METHODS AND SYSTEMS FOR SIMPLIFYING ORDERING FROM ONLINE SHOPS

(71) Applicant: Klarna Bank AB, Stockholm (SE)

(72) Inventors: David Buezas, Düsseldorf (DE);
Truong Son Pham, Ha Noi (VN);
Florian Schild, Düsseldorf (DE);
Manuel Schoebel, Bottrop (DE)

(73) Assignee: Klarna Bank AB, Stockholm (SE)

( * ) Notice: Subject to any disclaimer, the term of this patent is extended or adjusted under 35 U.S.C. 154(b) by 406 days.

(21) Appl. No.: 14/955,896

(22) Filed: Dec. 1, 2015

(65) Prior Publication Data
US 2017/0011441 A1    Jan. 12, 2017

(30) Foreign Application Priority Data
Jul. 7, 2015 (EP) ..................... 15175588

(51) Int. Cl.
G06Q 30/06    (2012.01)

(52) U.S. Cl.
CPC ..... G06Q 30/0615 (2013.01); G06Q 30/0601 (2013.01); G06Q 30/0613 (2013.01);
(Continued)

(58) Field of Classification Search
None
See application file for complete search history.

(56) References Cited

U.S. PATENT DOCUMENTS 6,378,075 B1 * 4/2002 Goldstein ............... A63F 13/12
705/64
6,490,602 B1 * 12/2002 Kraemer ................ G06Q 30/06
715/236

(Continued)

FOREIGN PATENT DOCUMENTS

WO     WO2017005873 A1    1/2017

OTHER PUBLICATIONS

Fink, J., et al., "Review and Analysis of Commercial User Modeling Servers for Personalization on the World Wide Web, A," User Modeling and User-Adapted Interaction 10: 209-249, 2000.*

(Continued)

*Primary Examiner* — Nicholas D Rosen
(74) *Attorney, Agent, or Firm* — Vierra Magen Marcus LLP

(57) ABSTRACT

Embodiments described herein simplify ordering of products from online shops. This may involve an agent server receiving captured contents of a product webpage from a client device and autonomously deriving product information therefrom. Alternatively, the agent service can receive a web address corresponding to a product webpage, and the agent server can visit the product webpage and capture its contents. The agent server then uses the derived product information to autonomously control ordering of the product for the user from an online shop, without requiring that the user have an account with the online shop, without requiring that the user enter personal and payment information in a check-out webpage of the online shop, without requiring that the user select a buy or shopping cart button associated with the online shop, and without requiring the online shop utilize an API to enable the agent server to interact with the online shop.

20 Claims, 7 Drawing Sheets

(52) U.S. Cl.
CPC ..... *G06Q 30/0617* (2013.01); *G06Q 30/0635* (2013.01); *G06Q 30/0641* (2013.01); *G06Q 30/0619* (2013.01)

(56) References Cited

U.S. PATENT DOCUMENTS

| | | | | |
|---|---|---|---|---|
| 6,535,880 | B1* | 3/2003 | Musgrove | G06Q 30/0603 705/26.43 |
| 6,873,968 | B2* | 3/2005 | Ehrlich | G06Q 20/201 705/20 |
| 7,225,156 | B2* | 5/2007 | Fisher | G06Q 20/02 235/379 |
| 7,305,355 | B2* | 12/2007 | Tarvydas | G06Q 30/06 705/26.43 |
| 8,554,638 | B2* | 10/2013 | Kirovski | G06Q 30/0603 705/26.64 |
| 9,058,623 | B2* | 6/2015 | Gindi | G06Q 30/0241 |
| 9,171,088 | B2* | 10/2015 | Thakur | G06F 17/30873 |
| 9,177,059 | B2* | 11/2015 | Musgrove | G06F 17/30864 |
| 2002/0038255 | A1* | 3/2002 | Tarvydas | G06Q 30/06 705/26.43 |
| 2002/0111873 | A1 | 8/2002 | Ehrlich et al. | |
| 2003/0126094 | A1* | 7/2003 | Fisher | G06Q 20/02 705/75 |
| 2004/0199430 | A1* | 10/2004 | Hsieh | G06Q 30/02 705/26.62 |
| 2008/0091546 | A1 | 4/2008 | Kirovski et al. | |
| 2010/0241518 | A1 | 9/2010 | McCann | |
| 2010/0250397 | A1 | 9/2010 | Ippolito | |
| 2011/0099088 | A1 | 4/2011 | Berrios et al. | |
| 2012/0233170 | A1 | 9/2012 | Musgrove et al. | |
| 2012/0253985 | A1 | 10/2012 | Maron et al. | |
| 2012/0259882 | A1* | 10/2012 | Thakur | G06F 17/30873 707/767 |
| 2012/0310914 | A1 | 12/2012 | Khan | |
| 2013/0054404 | A1* | 2/2013 | Garcia | G06F 17/3089 705/26.3 |
| 2013/0110647 | A1* | 5/2013 | Gindi | G06Q 30/0241 705/14.73 |
| 2015/0154683 | A1* | 6/2015 | Nishioka | G06Q 30/0625 705/26.62 |

OTHER PUBLICATIONS

Search Report dated Dec. 15, 2016 in International Patent Application No. PCT/EP2016/066183.
Anonymous, "1-Click—Wikipedia, the free encyclopedia", Apr. 21, 2015, Retrieved from the Internet on Sep. 19, 2016, https://en.wikipedia.org/w/index.php?title=1-Click&oldid=657663393.
Anonymous, "Document Object Model—Wikipedia, the free encyclopedia", Jun. 12, 2015, Retrieved from the Internet on Sep. 19, 2016, https://en.wikipedia.org/w/index.php?title=Document_Object_Model&oldid=666676242.
Anonymous, "Web scraping—Wikipedia, the free encyclopedia", Jun. 19, 2015, Retrieved from the Internet on Sep. 19, 2016, https://en.wikipedia.org/w/indexphp?title=Web_scraping&oldid=667566447.

* cited by examiner

METHODS AND SYSTEMS FOR SIMPLIFYING ORDERING FROM ONLINE SHOPS

PRIORITY CLAIM

This application claims priority to European Patent Application No. EP15175588, titled "Method for Assisted Order Handling Via the Internet", which was filed on Jul. 7, 2015, and is incorporated herein by reference.

BACKGROUND

FIG. 1 is a high level block diagram of an exemplary computer environment 100 in which online shopping, also known as e-commerce, can take place. Referring to FIG. 1, the computer environment 100 is shown as including a client computer device 112, upon which is installed a web browser 114, and a plurality of online shops 122a, 122b and 122c with which client computer device 102 can communicate via the Internet 102 to perform online shopping. The client computer device 102 can be, e.g., a desktop computer or a mobile computer, such as, but not limited to, a laptop computer, a tablet computer, a smartphone, a smartwatch, a person data assistant (PDA), or the like. The client computer device 102 can alternatively be a gaming console computer, or a smart television, or any other computer device that enables a user to access the Internet. The online shops 122a, 122b and 122c can be, e.g., Amazon.com™, eBay™ and Walmart.com™, wherein the parenthetical "(TM)" refers to a Trademark. The online shops 122a, 122b and 122c can be collectively referenced as online shops 122, or individual referenced as an online shop 122. Each online shop 122 can include one or more ordering server, which can be a vendor server running the online shop. The web browser 114 can be, e.g., Firefox™, Internet Explorer™, Google Chrome™, Opera™, Safari™, or Bing™, just to name a few.

The client computer device 112 can be more succinctly referred to as a client device 112, or alternatively as a user computer device 122 or a user device 122. The online shops 122 may also be referred to by other analogous names, such as, but not limited to, e-web-stores, e-shops, e-stores, Internet shops, web-shops, web-stores, online stores, or online retailers. While only three exemplary online shops 122 are represented in FIG. 1, there are actually millions of online shops 122 with which a client device (e.g., 112) can communicate and order products. The client device 112, and the ordering servers (that run an online shop 122), each include a least one processor and a memory storing one or more programs for execution by the at least one processor.

A user of the client device 112 can utilize the web browser 114 to browse and order products that are offered for sale by one or more of the online shops 122. Each such product can be a physical good or a service, wherein a service may be intangible. Exemplary physical goods that can be purchased from online shops 122 include clothes, shoes, books, music, sporting goods and plane tickets, just to name a few. Exemplary services that can be purchased from online shops 122 include streaming music services, streaming video services, and more conventional services, such as cleaning services and repair services, just to name a few.

While online shopping (also known as e-commerce) has been in existence for more than 20 years, and has made purchasing products more convenient than in the days prior to online shopping, there are still many aspects of online shopping that are complicated, inconvenient and time consuming for users. For example, after a user has utilized a web browser to identify a product that they want to order from an online shop, the user typically needs to enter and verify their email address, delivery address, billing address, payment information (e.g., credit or debit card information), a password, and/or other personal information before they can finally order the product. Where a user wants to order various different products from various different online shops, the user must repeat this process for each of the different online shops, which typically each have their own unique graphical user interface (GUI) that requires the user to enter similar personal information in various different ways in response to various different prompts, because there is no global standard that online shops follow to obtain such personal information. Further, this procedure typically requires a user to create and remember a password for each separate online shop. This procedure is not only time consuming and annoying to the user, but it is also error prone. Further, users often get frustrated before they complete the process of entering and/or verifying their personal information, and don't complete the ordering process. This is bad for the user, because the user fails to order the product that the user spent time finding and wants to purchase. This is also bad for the online shops, because they lose sales.

SUMMARY

Certain embodiments described herein and summarized below are directed to methods for simplifying ordering from online shops accessible via the Internet. In accordance with an embodiment, a method involves an agent server receiving, from a client device, captured contents of a product webpage that are captured in response to a user of the client device using a web-browser plug-in to indicate that that the user wants to order a product that is at least one of shown or described in the product webpage. The product webpage can be one of a plurality of webpages of a website that is hosted by or on behalf of an online shop. The product that the user indicated that they want to order can be a good or a service that is offered by the online shop. The captured contents of the product webpage can be received, e.g., by a web proxy service of the agent server.

The method further includes the agent server autonomously deriving product information from the captured contents of the product webpage received from the client device, wherein the product information is indicative of the product that the user indicated that they want to order from the online shop. The method also includes the agent server, using the derived product information, autonomously controlling ordering of the product for the user from the online shop, without requiring that the user have an account with the online shop, without requiring that the user enter personal and payment information in a check-out webpage of the online shop, without requiring that the user select a buy or shopping cart button associated with the online shop, and without requiring the online shop utilize an application program interface (API) to enable the agent server to interact with the online shop. The above and below summarized steps that are performed autonomously by the agent server can be performed, e.g., by an artificial intelligence (AI) service of the agent server.

In accordance with an embodiment the method also includes, prior to the agent server receiving the captured contents of the product webpage from the client device, providing a web-browser plug-in to the client device that enables the user of the client device to utilize the agent server, remote from the client device, to order one or more products for the user from any one of a plurality of different online shops, without requiring that the user have an account with any of the plurality of different online shops, without requiring that the user enter personal and payment information in a check-out webpage of any of the plurality of different online shops, without requiring that the user select a buy or shopping cart button affiliated with any of the plurality of different online shops, and without requiring that any of the plurality of different online shops utilize an API that enables the agent server to interact with the online shops;

In accordance with an embodiment, the product webpage comprises a hypertext markup language (HTML) document, the captured contents of the product webpage (that are received by the agent server) comprise a clone of the HTML document, and the product information (that is derived by the agent server) is derived from the clone of the HTML document. The HTML document, that the product webpage comprises, can include one or more user selections, selected by the user, that specify one or more configurations of the product that the user indicated that they want to order. In such a case, the clone of the HTML document will include information indicative of the one or more user selections, selected by the user, that specify the one or more configurations (also referred to as selectables) of the product that the user indicated that they want to order.

In accordance with an embodiment, computer readable program code, that enables the client device to produce the clone of the HTML document, is transferred from the agent server to the client device in response to the agent server receiving an indication, from the client device, that the user of the client device has used the provided web-browser plug-in to indicate that that the user wants to order the product. Alternatively, such computer readable code can be included as part of the provided web-browser plug-in.

In accordance with an embodiment, the agent server utilizes artificial intelligence (AI) to autonomously derive at least a portion of the product information from the captured contents of the product webpage. The agent server can additionally, and/or alternatively, utilize previously obtained online shop knowledge to autonomously derive at least a portion of the product information from the captured contents of the product webpage.

In accordance with an embodiment, deriving product information from the captured contents of the product webpage includes converting the clone of the HTML document to a product file having a standardized format, producing an object model including nodes organized in a tree from the product file having the standardized format, producing a mathematical matrix corresponding to the product webpage from the object model, and extracting features corresponding to the product information from the mathematical matrix. The product file having the standardized format can be, e.g., a JavaScript Object Notation (JSON) format, but is not limited thereto. The object model including nodes organized in a tree can be, e.g., a document object model (DOM), or a DOM-like structure, but is not limited thereto.

In accordance with an embodiment, the captured contents of the product webpage, that are received by the agent server, are captured by the client device in response the user clicking an agent order button provided by the web-browser plug-in, while the product webpage is being displayed on the client device. The agent order button is unaffiliated with the particular online shop that is selling the product that the users wants to order. In such an embodiment, the agent server can initiate the ordering of the product for the user in response to the agent server receiving a confirmation that the user wants to order the product.

In accordance with an embodiment, the provided web-browser plug-in or application receives the indication, that the user wants to order the product, in response to the user clicking an agent shopping-cart button provided by the web-browser plug-in, while the product webpage is being displayed on the client device. The agent shopping-cart button is unaffiliated with the online shop that is selling the product that the users wants to order. In such an embodiment, the agent server can initiate the ordering of the product for the user in response to the agent server receiving an indication that the user wants to order contents of the agent shopping-cart that includes the product.

In accordance with an embodiment, the agent server stores, in a job database of the agent server, job information that includes the product information derived from the captured contents of the product webpage and user information associated with the user that wants to order the product.

In accordance with an embodiment, autonomously ordering of the product that the user indicated that they want to order includes using one or more bots and a web-browser running on the agent server, and the job information, to emulate a human navigating to the product webpage of the particular online shop, entering one or more configurations of the product that the user indicated that they want to order, entering personal and payment information of the user in a check-out webpage of the particular online shop, and selecting a complete order option.

In accordance with an embodiment, the method also includes the agent server obtaining personal and payment information of the user, and storing the personal information of the user in a user information database of the agent server, wherein the user information database is unaffiliated with and inaccessible by the online shop that is selling the product that the users wants to order. Further, the method also includes the agent server using the stored personal information of the user when autonomously controlling ordering of the product for the user from the online shop. The personal information of the user can be obtained and stored in the user information database either prior to the agent server receiving the captured contents of the product webpage, or after the agent server receives the captured contents of the product webpage at step, as part of a process in which the agent server requests that the user confirm that the user wants to order the product.

In accordance with an alternative embodiment, rather than the agent server receiving captured contents of a product webpage from a client device, the agent server receives, from a client device or a third party website that is visited by a user using the client device, a web address corresponding to a product webpage for a product that the user wants to order from an online shop. The web address corresponding to the product webpage can be received, e.g., by a web proxy service of the agent server. The agent server then autonomously uses a web browser to visit the received web address (corresponding to the product webpage for the product that the user wants to order from the online shop), and the agent server autonomously captures contents of the product webpage. The agent server can thereafter autonomously derive product information from the captured contents of the product webpage, wherein the product information is indicative of the product that the user indicated that they want to order from the online shop. Further, the agent server uses the derived product information for autonomously controlling ordering of the product for the user from the online-shop, without requiring that the user have an account with the online-shop, without requiring that the user enter personal and payment information in a check-out webpage of the online-shop, without requiring that the user select a buy or shopping cart button associated with the online-shop, and without requiring the online-shop utilize an API to enable the agent server to interact with the online-shop. The above and below summarized steps that are performed autonomously by the agent server can be performed, e.g., by an artificial intelligence (AI) service of the agent server.

In accordance with an embodiment, a method further includes the agent server autonomously identifying, from the captured contents of the product webpage, selectables associated with the product that the user indicated that they want to order from the online shop. Further, the method includes the agent server autonomously serving a selectables page or pop-up that enables the user to specify the selectables associated with the product. The agent server then receives selectables information and derives therefrom product information corresponding to the selectables. Further, the agent server uses the derived product information corresponding to the selectables when autonomously controlling the ordering of the product for the user from the online-shop.

In accordance with an embodiment, the method includes (prior to the agent server receiving the web address corresponding to the product webpage for the product that the user wants to order from the online shop) providing an agent application to a client device that enables a user of the client device to utilize the agent server, remote from the client device, to order one or more products for the user from any one of a plurality of different online shops, without requiring that the user have an account with any of the plurality of different online shops, without requiring that the user enter personal and payment information in a check-out webpage of any of the plurality of different online shops, without requiring that the user select a buy or shopping cart button affiliated with any of the plurality of different online shops, and without requiring that any of the plurality of different online shops utilize an API that enables the agent server to interact with the online shops. In such an embodiment, the agent application, which is installable on the client device, can be configured to cause a web address corresponding to a product webpage to be sent, from the client device to the agent server, in response to the client device being used to share the web address of the product webpage with the agent application.

In accordance with another embodiment, the method includes (prior to the agent server receiving the web address corresponding to the product webpage for the product that the user wants to order from the online shop) providing an agent application to a third party website that enables a user of a client device to utilize the agent server, remote from the client device, to order one or more products for the user from any one of a plurality of different online shops that sell products which are displayed on or otherwise linked to by the third party website, without requiring that the user have an account with any of the plurality of different online shops, without requiring that the user enter personal and payment information in a check-out webpage of any of the plurality of different online shops, without requiring that the user select a buy or shopping cart button affiliated with any of the plurality of different online shops, and without requiring that any of the plurality of different online shops utilize an API that enables the agent server to interact with the online shops. The agent application, which is installable on the third party website, can be configured to cause a web address corresponding to a product webpage to be sent, from the third party website to the agent server, in response to the third party website being used to share the web address of the product webpage with the agent application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3A is a high level flow diagram that is used to summarize certain embodiments of the present technology that utilize an agent plug-in.

DETAILED DESCRIPTION

As explained above, while online shopping has made purchasing products more convenient than in the days prior to online shopping, there are still many aspects of online shopping that are complicated, inconvenient and time consuming for users. Embodiments of the present technology, which are described below, can be used to simplify the ordering of products from online shops accessible via the Internet. Such products, as noted above, can be goods or services. It is also possible for a product to be referred to as an object. However, the term product is preferred over the term object, so that the term is distinguishable from the term object as used in computer science.

Figure 1:
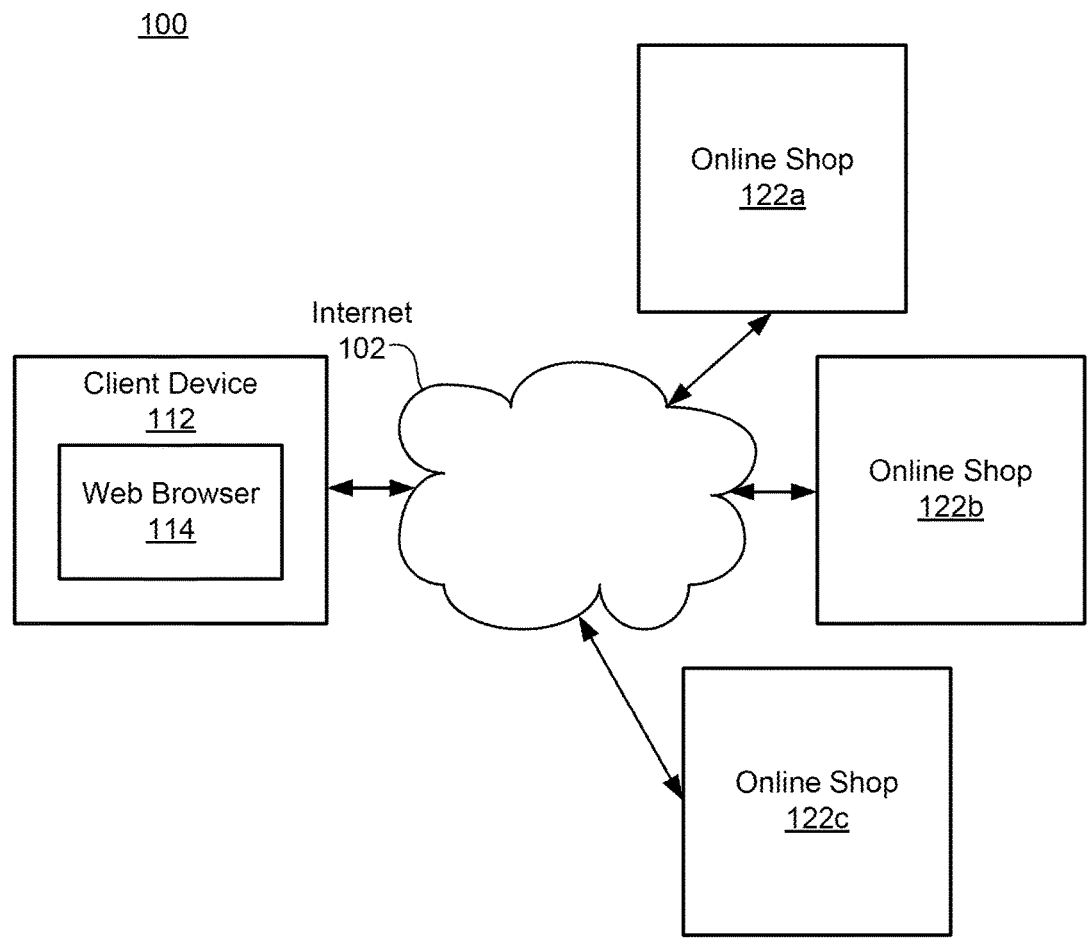
FIG. 1 is a high level block diagram of an exemplary computer environment in which online shopping, also known as e-commerce, can take place.
Figure 2:
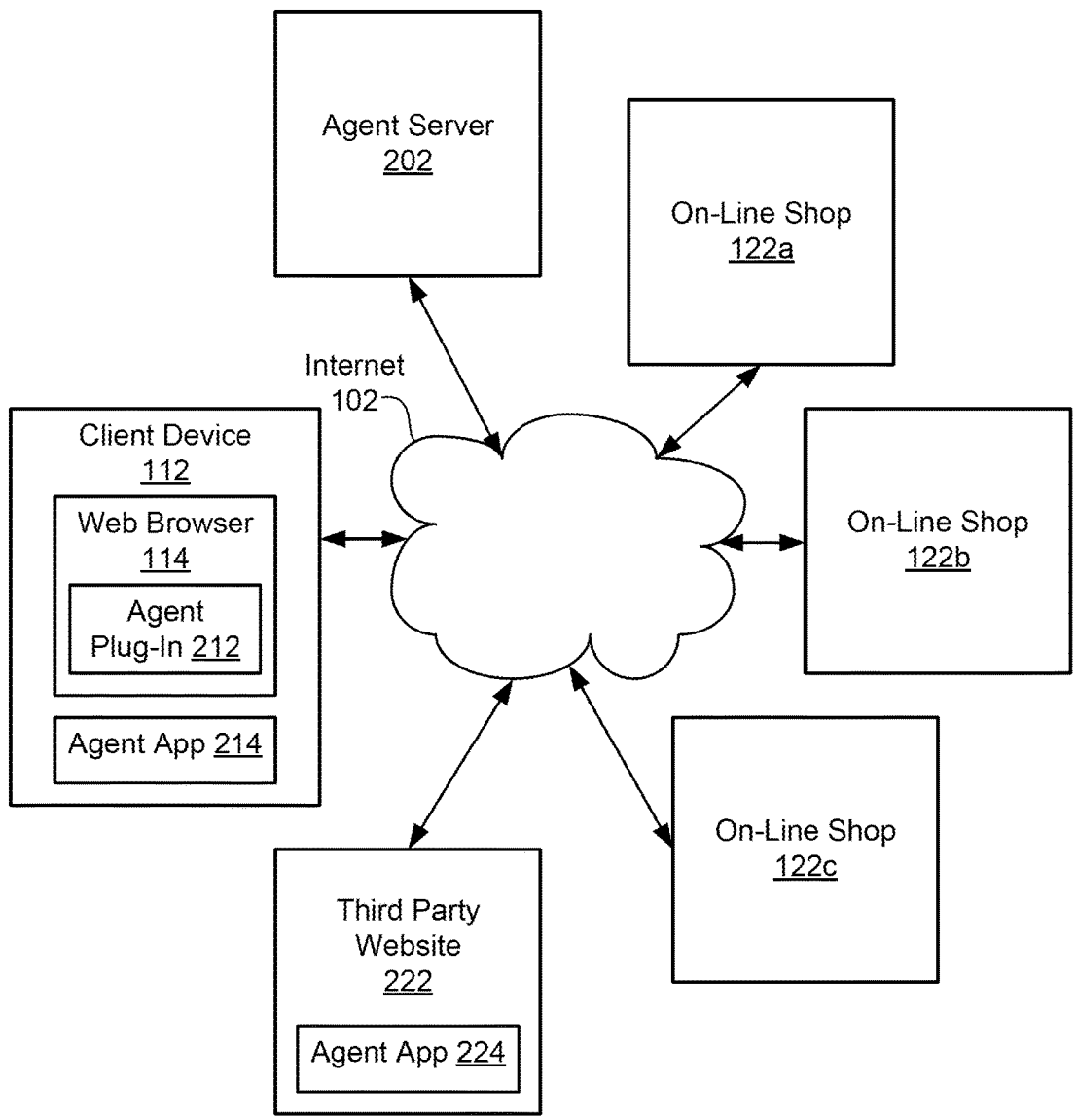
FIG. 2 is a high level block diagram of an exemplary computer environment in which embodiments of the present technology can be used.

FIG. 2 is a high level block diagram of an exemplary computer environment 200 in which embodiments of the present technology can be used. Referring to FIG. 2, the computer environment 200 is shown as including a client device 112, upon which is installed a web browser 114, and a plurality of online shops 122a, 122b and 122c with which client device 102 can communicate via the Internet 102 to perform online shopping. Exemplary details of the client device 112, the web browser 114, and the online shops 122 were described above with reference to FIG. 1, and thus, need not be repeated. As noted above, in the discussion of FIG. 1, while only three exemplary online shops 122 are represented, there are actually millions of online shops 122 with which a client device (e.g., 112) can communicate and order products. Similarly, while only one client device 112 is represented, there are actually millions of client devices that users may use to order products from online shops.

Still referring to FIG. 2, the computer environment 200 is also shown as including an agent server 202, which is used to implement certain embodiments of the present technology. The agent server 202 can include a least one processor and a memory storing one or more programs for execution by the at least one processor. Additionally details of the agent server 202, according to certain embodiments, are described below with reference to FIG. 4. Still referring to FIG. 2, the web browser 114 in FIG. 2 is shown as including an agent plug-in 212, which can also be referred to as an agent browser extension or an agent browser add-on. The agent plug-in 212 is a computer program (e.g., a JavaScript program, but not limited thereto) that extends the functionality of the web browser 212. As will appreciated from the following discussion, the agent plug-in 212 can be used to enable the agent server 202 to control the ordering of one or more products for a user of the client device 112, from one or more of the online shops 122, in a manner that is less complicated, more convenient and less time consuming for the user. As will be described in additional details, with reference to FIG. 3A, the agent plug-in 212 can be downloaded to the client device 112 in response to the user of the client device 112 registering with the agent server 202 via a registration webpage served by the agent server 202. It is also possible that the agent plug-in 212 can be downloaded to the client device 112 from an application store, which is also known as an "app store" or an "app marketplace".

Also shown in FIG. 2 is an agent application 214 that is installed on the client device 112, which can be used, instead of the agent plug-in 212, to enable the agent server 202 to control the ordering of one or more products for a user of the client device 112, from one or more of the online shops 122, in a manner that is less complicated, more convenient and less time consuming for the user. The agent application 214 may be used instead of the agent plug-in 212, e.g., where the web browser 114 on the client device 112 does support plug-ins. This may be the case, e.g., where the client device 112 is a mobile device (e.g., a smartphone or tablet computer) and the web browser 114 is a mobile browser. Accordingly, the agent application 214 may be a mobile application (also known as a mobile app), but is not limited thereto. As will be described in additional details, with reference to FIG. 3B, the agent application 214 can be downloaded to the client device 112 in response to the user of the client device 112 registering with the agent server 202 via a registration webpage served by the agent server 202. It is also possible that the agent application 214 can be downloaded to the client device 112 from an application store, which as noted above is also known as an "app store" or an "app marketplace".

FIG. 2 also shows a third party website 222, on which an agent application 224 is installed. To distinguish between the agent application 214 included on the client device 112, and the agent application 222 included on the third party website 222, the agent application 214 included on the client device 112 may also be referred to as the agent client application 214, and the agent application 222 included on the third party website 222 may also be referred to as the agent third party application 222.

The third party website 222 can be, e.g., a website that does not sell products directly, but may include content from and/or links to one or more online shops 222. For example, the third party website 222 can be a social networking service website, such as Facebook™, or a content sharing service website, such as Pinterest™, or a social commerce website, such as Polyvore™, but is not limited thereto. The third party website 222 may or may not receive a commission from an online shop 122, e.g., if a user while visiting the third party website 222 clicks on a link to one of the online shops 122 and purchases a product from the online shop 122. The user of the client device 112 can visit the third party website 222 via the web browser 114. Alternatively, a third party application (e.g., a Facebook™ mobile application) that is stored on the client device 112 can enable the user to visit the third party website 222 without using the web browser 114.

As will be describe in additional details below, the agent plug-in 212 (or the agent application 214 or 224) and the agent server 202 can be used to simplify the ordering of products from online shops accessible via the Internet. For example, if the user of the client device 112 wants to order a particular product (e.g., a particular pair of shoes, in a particular color and a particular size) from the particular online shop 122a, the agent plug-in 212 (or the agent application 214) and the agent server 202 operate in such a manner to enable the agent server 202 to control the ordering of the product (e.g., the particular pair of shoes, in the particular color and the particular size) from the particular on-online shop 122a, without requiring that the user create an account with the particular online shop 122a, without requiring that the user enter personal and payment information in a check-out webpage of the particular online shop 122a, without requiring that the user select a buy or shopping cart button associated with the particular online shop 122a, and without requiring the particular online shop 122a utilize an application program interface (API) to enable the agent server 202 to interact with the particular online shop 122a.

Figure 3A:
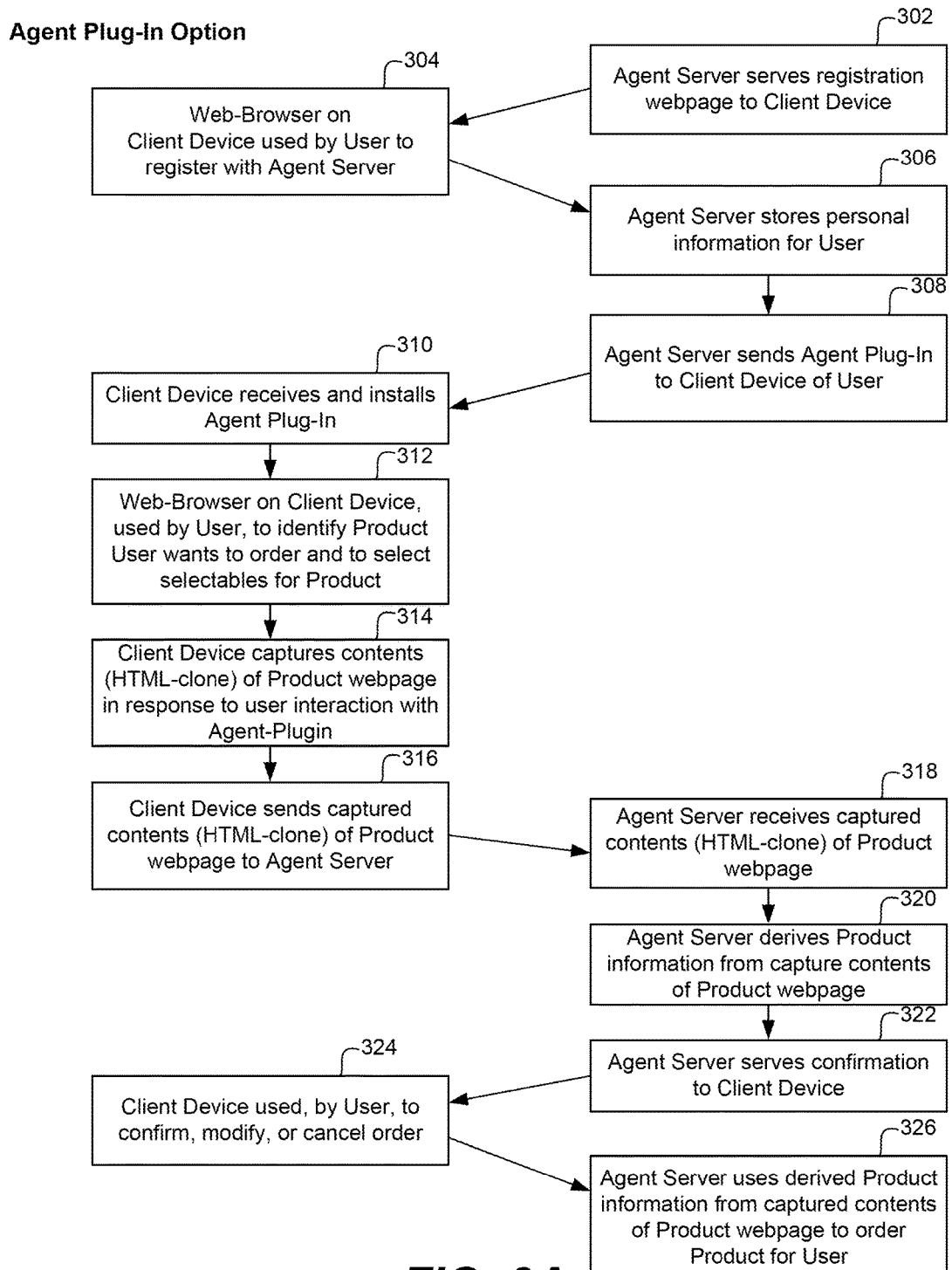

The high level flow diagram of FIG. 3A will now be used to describe a method according to an embodiment of the present technology. Variations on this method are also explained. In FIG. 3A, the steps shown on the right side are generally performed on or by the agent server 202, and the steps shown on the left side are generally performed on or by the client device 112 with which a user is interacting. Referring to FIG. 3A, at step 302, the agent server 202 serves a registration webpage to a client device 112, e.g., in response to the user of the client device 112 using the web browser 114 to visit a website of the agent server 202, or in response to the user of the client device 112 clicking on a link associated with the agent server 202.

At step 304, the web browser 114 on the client device 112 is used, by the user, to register with the agent service 202. At step 306 the agent service 202 stores personal information for the user in a user information database (e.g., 414 in FIG. 4). At step 308, the agent plug-in 212 is sent to the client device 112, and at step 310 the agent plug-in 212 is installed on the client device 112. In other words, the agent plug-in 212 can be downloaded to the client device 112 in response to the user of the client device 112 registering with the agent server 202 via a registration webpage served by the agent server 202. The agent plug-in 212 can be made available for downloading directly from the agent server 202. Additionally, or alternatively, the agent plug-in 212 can be made available for downloading from one or more app stores.

During a registration process, the agent server 202 can obtain personal information from the user of the client device 112. The personal information can include, e.g., the name, address and phone number of the user, a delivery address for the user and payment information for the user. In certain embodiments, the user can be allowed to enter multiple delivery addresses, such as a home delivery address and a work delivery address, which will enable the user to selectively have different products delivered to different addresses, as specified by the user. The payment information can include, e.g., a billing address and credit or debit card information, PayPal™ information and/or eCheck information, but is not limited thereto. In certain embodiments, the user can be allowed to enter multiple types of payment information, such as payment information associated with a personal credit or debit card, payment information associated with a work credit or debit card, payment information associated with a personal PayPal™ account, payment information associated with a work PayPal™ account, payment information associated with a personal eCheck account, and/or payment information associated with a work eCheck account. This will enable the user to selectively bill different products to different credit or debit cards, different PayPal™ accounts and/or different eCheck accounts. The registration process may also require that a user select a password that can be used for user authentication. The above described personal information can be stored, e.g., in a secure user information database (e.g., 414 in FIG. 4) of the agent server 202, as will be discussed in further detail below. The user may be required to enter their password whenever the user wants to have the agent server 202 order a product from them, and/or whenever the user confirms an order. Alternatively, once a user has entered their password using a specific client device 112, the user can thereafter use that same client device 112 to interact with and cause the agent server 202 to order products for the user, without the user needing to reenter their password.

After entering their personal information, the user can be instructed to install the agent plug-in 212 by selecting (e.g., clicking) an "add-now" button, or the like, in response to which instructions are provided to the user that when followed, cause the agent plug-in 212 to be downloaded via the Internet 102 and installed on the client device 112. As noted above, the agent plug-in 212 can be made available for downloading directly from the agent server 202, and/or from one or more app stores.

In accordance with an embodiment, once the agent plug-in 212 has been installed on the client device 112, the agent plug-in 212 will cause an agent plug-in icon (associated with the agent plug-in 212) to appear when the graphical user interface (GUI) of the web browser 114 is displayed. For example, the agent plug-in icon can appear to the right of an address bar and/or search bar of the GUI of the web browser 114. Alternatively, rather than causing the agent plug-in icon to be displayed next to (e.g., to the right of) an address bar and/or search bar of the GUI of the web browser 114, the agent plug-in 212 can cause the agent plug-in icon to overlay a portion of a product webpage, so that the agent plug-in icon appears to be included as part of the product webpage served by an online shop 122, even though the agent plug-in icon is not actually part of the product webpage. The agent plug-in icon is preferably distinguishable from icons associated with the online shops 122, so that users can easily distinguish between the agent plug-in icon and icons of the online shops 122. The agent plug-in icon is preferably also distinguishable from icons associated with other web browser plug-ins. For a specific example, the agent plug-in icon can resemble a stylized shopping cart, but is not limited thereto.

In accordance with an embodiment, in response to a user selecting the agent plug-in icon, a bar associated with the agent plug-in is displayed (e.g., along the right side of a screen, but not limited thereto), which enables the user of the client device 112 to order a product that is current being displayed using the web browser 114. The bar associated with the agent plug-in (which can also be referred to as the agent bar) can provide the user with multiple options, including a "one-click buy" option, an "add to universal shopping cart" option, and a "show dashboard" option, each of which is discussed below. Each of these options can be represented by its own respective agent icon, which when hovered over causes a text pop up to be displayed, which textually describes (in one or a few words) the function or option associated with the specific agent icon.

Still referring to FIG. 3A, at step 312 the web browser 114 on the client device 112 is used by the user to identify one or more products that the user wants to order. Where a product is available in different selectable configurations (e.g., in different colors and sizes), step 312 also includes the web browser 114 on the client device 112 being used by the user to specify the configurations of the product. At step 314, the client device captures contents of a product webpage associated with the product that the user wants to order, and at step 316 the captured contents are sent to the agent server. For example, in response to the user selecting the one-click buy option, while the user is viewing a particular product available for purchase from a particular online shop (e.g., the online shop 122a) using the web browser 112, an agent process by which the agent server 202 orders the particular product for the user from the particular online shop 122a is initiated. More specifically, in response to the user selecting the one-click buy option, the client device 112 captures contents of a product webpage in which the product to be ordered is displayed, and sends the captured contents of the product webpage to the agent server 202 via the Internet 102.

The aforementioned product webpage is one of a plurality of webpages of a website that is hosted by or on behalf of the particular online shop (e.g., 122a) from which the user wishes to order a particular product. The product webpage can be a hypertext markup language (HTML) document including one or more fields that accept user selections. The fields can allow a user to select particular selections (which can also be referred to as selectables, configurables, or configurations) for a particular product. For example, where the product that the user wishes to order is a particular pair of shoes that comes in different colors and sizes, the fields can allow a user to select a particular color and a particular size, wherein color and size are exemplary configurations or selectables of the product, which in this case, is a particular pair of shoes. In accordance with an embodiment, the captured contents of the product webpage, that are captured by the client device 112 and sent via the Internet 102 to the agent server 202, is a clone of the HTML document that includes the field(s) that contain user selections that specify selectables (e.g., the color and size) of the product (e.g., the particular pair of shoes) that the user indicated that they want to order.

The clone of an HTML document, which can also be referred to herein as an HTML-clone, can include various text, including, e.g., HTML text, cascading style sheets (CSS) text, and scrips, but are not limited thereto. CSS is a style sheet language used for describing the presentation of a document written in a markup language, such as HTML. CSS text may, e.g., specify the separation of HTML document content from document presentation, including aspects such as the layout, colors, and fonts. The HTML-clone can also include a web address, which includes a uniform resource locator (URL) associated with the HTML document, or more generally, with the product webpage.

In accordance with an embodiment a cloning program (e.g., a JavaScript program, but not limited thereto), that enables the client device 112 to produce the clone of the HTML document, is transferred from the agent server 202 to the client device 112 in response to the agent server 202 receiving an indication, from the client device 112, that the user of the client device 112 has used the agent plug-in 212 to indicate that that the user wants to order a particular product (with user specified selections) that the user is presently viewing via the web browser 114. Alternatively, the cloning program, that enables the client device to produce the clone of the HTML document, is included as part of the agent plug-in 212.

Still referring to FIG. 3A, at step 318, the agent server 202 receives the captured contents of the product webpage. More specifically, at step 318 the agent service 202 can receive an HTML-clone from the client device 318. In this case, since the HTML-clone includes user selected selectables (e.g., color and size) associated with the product, the HTML-clone can be referred to as an HTML-clone that includes user specified selectables, or more generally as captured contents of the product webpage that includes user specified selectables.

At step 320 the agent server derives product information from the captured contents of the product webpage. At step 322 the agent server 202 servers a confirmation to the client device 112, which enables the user to confirm, modify or cancel the order. For example, in accordance with an embodiment, after the user selects the one-click buy option, a confirmation page or pop-up is thereafter served and displayed to the user, to inform the user that the product will be ordered within a specified amount of time (e.g., 30 minutes), and provides the user with an option (e.g., a cancel button) for canceling the order. The confirmation page or pop-up will preferably include an image, title and price of the product. Thereafter, if the user does not indicate, within the specified amount of time (e.g., 30 minutes), that the user wants to cancel the order, the agent server 202 will perform the agent process for ordering the particular product from the particular online shop 122a for the user. In accordance with an embodiment, the confirmation page or pop-up, which is displayed to the user, can provide the user with an option (e.g., a confirm button) for affirmatively confirming the order prior to the specified amount of time (e.g., 30 minutes) elapsing.

At step 326 the agent server 202 orders the product(s) for the user. Addition details of the agent process by which the agent server 202 orders one or more particular product(s) from one or more particular online shop(s) 122 for the user are described below. In a specific embodiment, the agent server 202 will only perform the agent process to order the product(s) for a user in response to the user affirmatively confirming, e.g., via the confirmation page or pop-up, that the user wants the product(s) ordered. In other embodiments, the agent server 202 will perform the agent process to order the product(s) so long as the user does not cancel their order within a specified amount of time (e.g., 30 minutes) of the confirmation page or pop-up being served to the client device 112 of the user.

If the user had included multiple shipping addresses, when registering with the agent server 202, the confirmation page or pop-up can provide the user with an option to indicate which shipping address is to be used. If the user had included multiple different payment information options, when registering with the agent server 202, the confirmation page or pop-up can provide the user with an option to indicate which payment information option (e.g., which credit or debit card) is to be charged or debited. The confirmation page or pop-up may also give the user an option of entering and selecting a new shipping address, e.g., if the user is ordering the product as a gift for another person. The confirmation page or pop-up may also give the user an option of entering and selecting new payment information, e.g., if the user wants to pay for the product using a new credit or debit card that they recently received. In a preferred embodiment, the confirmation page or pop-up that is served by the agent server 202 has a standard look and feel format associated with the agent server 202, which will be the same regardless of which online shop 122 is selling the product for which the confirmation page or pop-up is served. This way, when a user utilizes the agent server 202 to order products, the user will be familiar with the GUIs associated with the agent server 202.

In certain embodiments, if the user had not specified one or more of the selectables at the time that the contents of a product webpage were captured and sent from the client device 112 to the agent server 202 (at steps 314 and 316), the agent server 202 can identify selectables and serve a selectables page or pop-up to the client device 112, which enables the user to specify any selectables that were missing. Selectables information can be sent from the client device 112 to the agent server 202 to enable an order to be completed by the agent server 202. Exemplary details of such a selectables page or pop-up, and information that can be extracted therefrom, are discussed below with reference to FIGS. 3B, 3C and 5.

Where the agent server 202 provides a universal shopping cart option, in response to the user clicking the "add to universal shopping cart" option (at step 312), while the user is viewing a particular product available for purchase from a particular online shop (e.g., the online shop 122a) using the web browser 112, the client device 112 captures contents of a product webpage (at step 314) in which the product to be ordered is displayed, and sends the captured contents of the product webpage to the agent server 202 via the Internet 102 (at step 316). In a similar manner as was described above, with respect to the one-click buy option, the captured contents of the product webpage can be a clone of an HTML document that includes field(s) that include user selections that specify configurations (e.g., the color and size) of the product (e.g., the particular pair of shoes) that the user indicated that they want to order. Further, in a similar manner as was described above with respect to the one-click buy option, the clone of the HTML document (and more generally, the captured contents of the product webpage) are sent by the client device 112, via the Internet 102, to the agent server 202. Whether the one-click buy option, or the universal shopping cart option, is being used, when capture contents of a product webpage are sent from the client device 112 to the agent service 202, a unique user identifier (user ID) can also be sent, so that the agent server 202 knows which user wants to order the product. This enables the appropriate user to be billed, the product to be sent to an appropriate mailing address, and the product to be associated with the dashboard for the user. The unique user ID also enables a universal shopping cart to be associated with a specific user.

After the user of the client device 112 has placed one or more products in their universal shopping cart, the user can visit their universal shopping cart, which is maintained for them by the agent server 202, and view the contents of their universal shopping cart. The user can be given the option to remove one or more products from their universal shopping cart, e.g., by displaying a remove button associated with each product. The user can be given the option to order all of the products included in their universal shopping cart, e.g., by selecting a checkout or similar button, in response to which the agent server 202 will perform the agent process for ordering all of the products included in the user's universal shopping cart. When viewing their universal shopping cart, the user can be provided with options for selecting among different shipping addresses and payment options. The user may also be provided with the option of adding a new shipping address, and/or a new payment option, for similar reasons to those discussed above with respect to the one-click buy option. The universal shopping cart can include various different products that are to be ordered from various different online shops 122.

In response to the user selecting the "show dashboard" option, the user can be presented with a dashboard graphical user interface (GUI) that enables the user to view all of their one-click buy orders, as well as to view the contents of their universal shopping basket. When the one-click buy orders are displayed, there can be an indication associated with each product, which indicates whether the order is "open", or has already been "ordered." If an order for a particular product is indicated as being open, then the user is given the option to cancel that order, e.g., by selecting a cancel button. An order for a particular product may still be open, e.g., if a specified amount of time (e.g., 30 minutes) during which an order can still be canceled has not yet elapsed. Once that specified amount of time has elapsed, or the user has affirmatively confirmed an order, the agent server 202 will perform its agent process that causes the product to be ordered for the user, and then there will be an indication in the dashboard GUI that the product has been already ordered. When a universal shopping cart order is displayed, there can be status indicator associated with cart, which indicates whether the order is open or whether the products in the cart have been ordered. An order may still be open, e.g., if a user has not yet indicated that they want to check out the products included in their universal shopping cart. The status indictor may indicate that an order is being processed, e.g., if the agent server 202 is still in the process of attempting to complete an order. Other variations are also possible. Once the agent server 202 has successfully placed an order, a status indicator associated with the cart will specify that the products in the universal shopping cart have been ordered. In view of the above, the dashboard enables a user to conveniently view a central ecommerce account displaying all products ordered, including product images, titles, prices and configurations. The dashboard may also provide information about actual and/or predicted date(s) of delivery, correspondence with online shops (e.g. newsletters) and return policies.

Figure 3B:
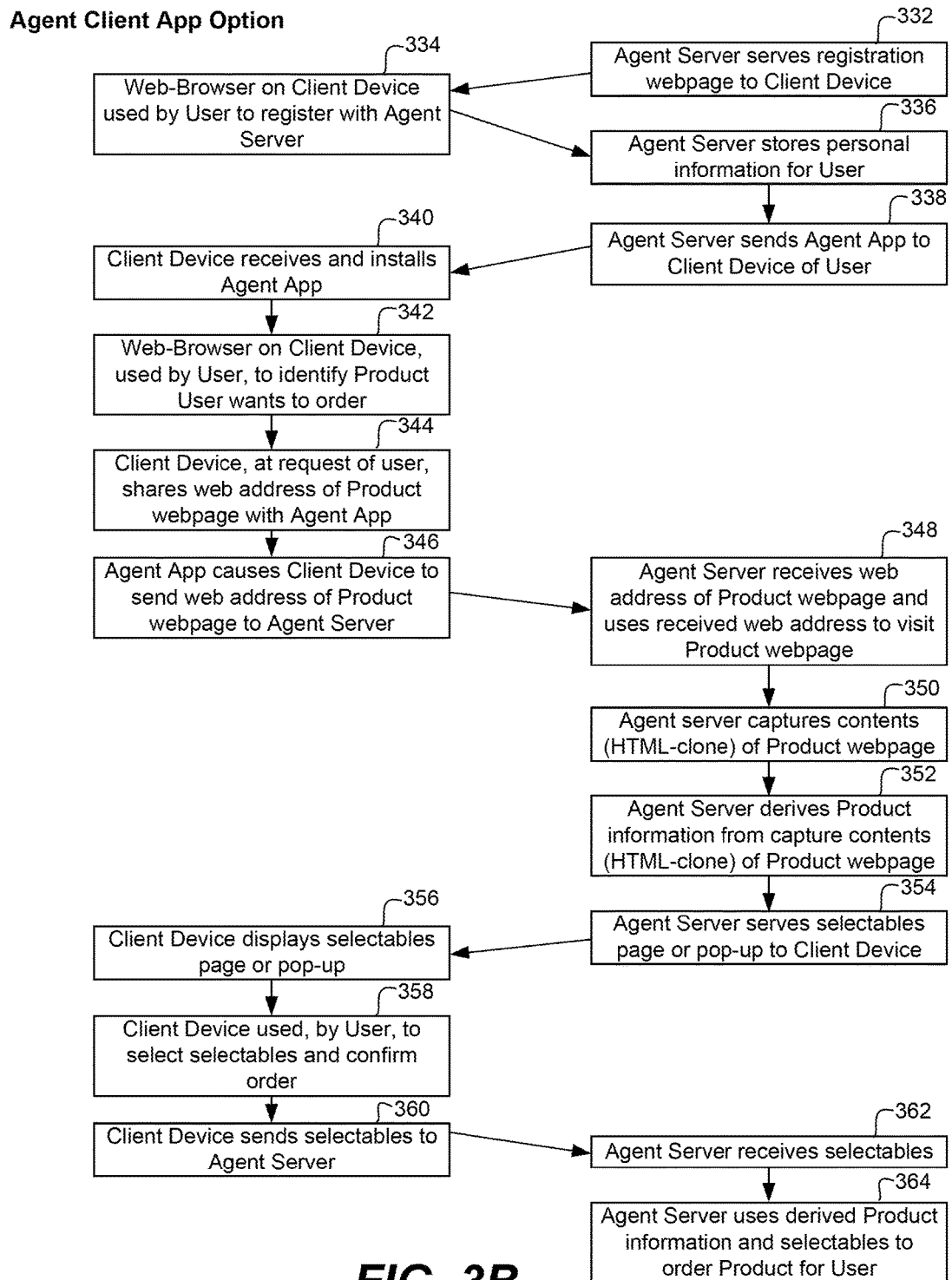
FIG. 3B is a high level flow diagram that is used to summarize certain embodiments of the present technology that utilize an agent application (e.g., a mobile app) that is installed on the client device.

The high level flow diagram of FIG. 3B will now be used to describe a method according to another embodiment of the present technology. Variations on this method are also explained. As was the case in FIG. 3A, in FIG. 3B, the steps shown on the right side are generally performed on or by the agent server 202, and the steps shown on the left side are generally performed on or by the client device 112 with which a user is interacting. Referring to FIG. 3B, at step 332, the agent server 202 serves a registration webpage to a client device 112, e.g., in response to the user of the client device 112 using the web browser 114 to visit a website of the agent server 202, or in response to the user of the client device 112 clicking on a link associated with the agent server 202.

At step 334, the web browser 114 on the client device 112 is used, by the user, to register with the agent service 202. At step 336 the agent service 202 stores personal information for the user in a user information database (e.g., 414 in FIG. 4). At step 338, the agent application 214 is sent to the client device 112, and at step 340 the agent application 214 is installed on the client device 112. In other words, the agent application 214 can be downloaded to the client device 112 in response to the user of the client device 112 registering with the agent server 202 via a registration webpage served by the agent server 202. The agent application 214 can be made available for downloading directly from the agent server 202. Additionally, or alternatively, the agent application 214 can be made available for downloading from one or more application stores, which as noted above, are also known as "app stores" or "app marketplaces".

During the registration process, the agent server 202 can obtain personal information from the user of the client device 112. As noted above in the discussion of FIG. 3A, the personal information can include, e.g., the name, address and phone number of the user, a delivery address for the user and payment information for the user. As also noted above in the discussion of FIG. 3A, the user can be allowed to enter multiple delivery addresses, and multiple types of payment information. The registration process may also require that a user select a password that can be used for user authentication. The above described personal information can be stored, e.g., in a secure user information database (e.g., 414 in FIG. 4) of the agent server 202.

After entering their personal information, the user can be instructed to install the agent application 214 by selecting (e.g., clicking) an "add-now" button, or the like, in response to which instructions are provided to the user that when followed, cause the agent application 214 to be downloaded via the Internet 102 and installed on the client device 112. As noted above, the agent plug-in 214 can be made available for downloading directly from the agent server 202, and/or from one or more app stores. Once the agent application 214 has been installed on the client device 112, an agent application icon associated with the agent application 214 can appear on a home screen or another GUI screen that enables a user of the client device 112 to selective activate the agent application 214. The agent application icon is preferably distinguishable from other application icons.

Still referring to FIG. 3B, at step 342 the web browser 114 on the client device 112 is used by the user to identify a product that the user wants to order. Such a product is viewable on a product webpage that is served by or on behalf of one of the online shops 122. At step 344, the client device 112, at the request of the user (e.g., in response to a user input or selection), shares the web address of the product webpage with the agent application 214. At step 346, the agent application 214 causes the client device 112 to send the web address of the product webpage to the agent server 202 via the Internet 102. The web address can be, or include, a URL.

At step 348 the agent server 202 receives the web address of the product webpage, and uses the received web address of the product webpage to autonomously visit the product webpage. More specifically, at step 348, a web browser running on the agent server 202 can use the received web address to visit the product webpage. The web browser used by the agent server 202 can be, e.g., a headless browser, but is not limited thereto. At step 350, the agent server 202 captures contents of the product webpage associated with the product that the user wants to order. In accordance with an embodiment, the captured contents of the product webpage, that are captured by the agent server at step 350, is a clone of the HTML document that includes the field(s) that allow a user to select user selections (e.g., the color and size) of the product (e.g., a particular pair of shoes) that the user indicated that they want to order. The same or a similar cloning program (e.g., a JavaScript program, but not limited thereto) that enables the client device 112 to produce an HTML-clone at step 314 (in FIG. 3A), can be used by the agent server 202 at step 350. As was the case in the embodiment described above with reference to FIG. 3A, the HTML-clone can include various text, including, e.g., HTML text, CSS text, and scrips, but are not limited thereto. In contrast to the HTML-clone including user specified selectables, which can be produced by the client device 112 at step 314 (discussed above with reference to FIG. 3A), the HTML-clone produced by the agent server 202 at step 350 does not yet include user specified selectables (e.g., color and size selections). Accordingly, the HTML-clone produced by the agent server 202 at step 350 can be referred to as an HTML-clone not including user specified selectables, or more generally, as captured contents of the product webpage not including user specified selectables.

At step 352 the agent server 202 derives product information from the captured contents of the product webpage. The product information can include, e.g., the product title, the product price, the name of the online shop 122 selling the product, and/or the like. The product information can also include information about selectables (e.g., color and size) that the use still needs to select. At step 354, based on the product information that the agent server 202 derives at step 352, the agent server 202 generates and serves a selectables page or pop-up to the client device 112, which enables the user of the client device 112 to indicate their selections (e.g., color and size) for the product that the user wants to order. The selectables page or pop-up, served at step 354, preferably also includes the title and price of the product that the user wants to order, and can also include an image (e.g., picture) of the product. In a preferred embodiment, the selectables page or pop-up that is served by the agent server 202 has a standard look and feel format associated with the agent server 202, which will be the same regardless of which online shop 122 is selling the product for which the selectables page or pop-up is served. This way, when a user utilizes the agent server 202 to order products, the user will be familiar with the GUI associated with the agent server 202.

Still referring to FIG. 3B, at step 358, the client device 112 is used by the user to view and interact with the selectables page or pop-up to specify their selections (e.g., color and size). At step 360 the selectables (e.g., color and size), and more specifically information indicative thereof, are sent from the client device 112 to the agent server 202 via the Internet at step 360. For example, there may be a "process order" button, or the like, included on the selectables page or pop-up that causes information indicative of the user specified selectables to be sent from the client device 112 to the agent server 202. At step 362 the agent server 202 receives the user specified selectables information from the client device 112. At step 364 the agent server 202 uses the product information (derived at step 352) and the selectables information (received at step 362) to order the product for the user.

The fact that the user completed step 358 can be treated as a confirmation that the user wants to order the product. Alternatively, in a similar manner as was discussed above with reference to steps 322 and 324 of FIG. 3A, the agent server 202 can serve a confirmation page or pop-up to the client device 112, which enables the user to confirm, modify or cancel the order. The user can be allowed to select and/or change a shipping address and payment option using the selectables page or pop-up, or using the confirmation page or pop-up. If the product that a user wants to order does not have any selectables (e.g., if the product is offered for sale in only one color and size), certain steps (e.g., 354, 356, 360 and 362) may be skipped.

Figure 3C:
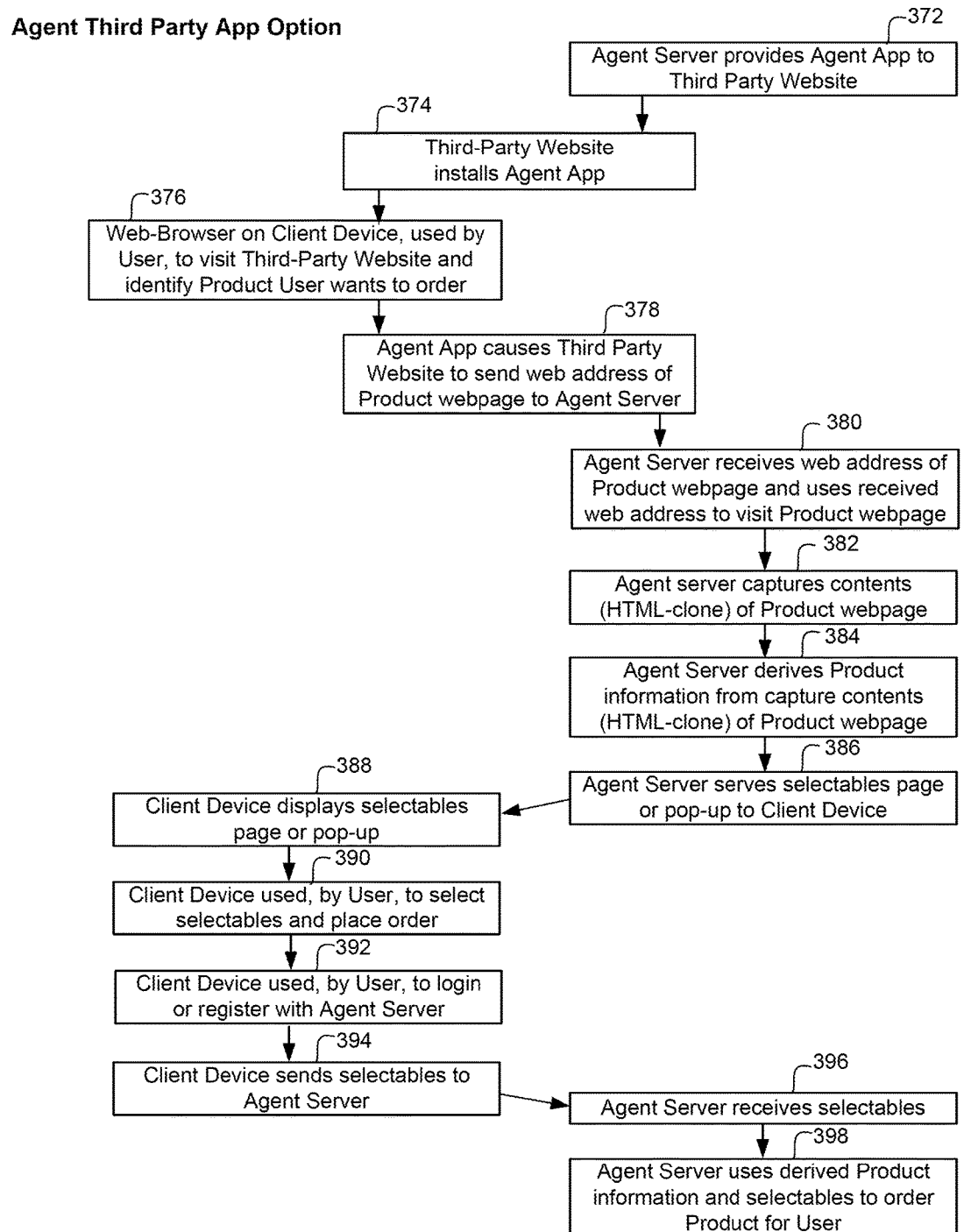
FIG. 3C is a high level flow diagram that is used to summarize certain embodiments of the present technology that utilize an agent application that is installed on third party website.

The high level flow diagram of FIG. 3C will now be used to describe a method according to still another embodiment of the present technology. Variations on this method are also explained. As was the case in FIGS. 3A and 3B, the steps shown on the right side are generally performed on or by the agent server 202, and the steps shown on the left side are generally performed on or by the client device 112 with which a user is interacting. In FIG. 3C, the steps shown down the center (between the left and right sides) are generally performed by a third party website (e.g., 222 in FIG. 2) that is not one of the online shops 122. Exemplary types of third party websites 222 were discussed above with reference to FIG. 2.

Referring briefly back to FIG. 2, a third party website 222 can have an agent application 224 installed, wherein the agent application 224 is made available to the third party website 222 by the agent server 202. As will be described in additional details below, the agent application 224 and the agent server 202 can be used to simplify the ordering of products from online shops, where the products are shown on the third party website 222. For example, if the user of the client device 112 wants to order a particular product (e.g., a particular pair of shoes) that is shown on the third party website 222 (on which the agent application 224 is installed), the agent application 224 and the agent server 202 operate in such a manner to enable the agent server 202 to control the ordering of the product (e.g., the particular pair of shoes) from an on-online shop 122, without requiring that the user create an account with the online shop 122, without requiring that the user enter personal and payment information in a check-out webpage of the online shop 122, without requiring that the user select a buy or shopping cart button associated with the online shop 122, and without requiring the online shop 122 utilize an API to enable the agent server 202 to interact with the online shop 122.

Referring to FIG. 3C, at step 372 that agent server 202 provides the third party website 222 with the agent application 224, and at step 374 the agent application 224 is installed on the third party website 222. In accordance with an embodiment, the agent application 224 causes a "buy", "purchase", "order" or similar type of button to be displayed for (e.g., next to) one or more products that is/are being shown on one or more webpages of the third party website 222. At step 376, the web browser 114 (or a third party application) on the client device 112 is used by a user to visit the third party website 222 and identify a product that the user wants to order. At step 378, the agent application 224 causes the third party website to send the web address of the product webpage 378 to the agent server 202. Step 378 is similar to step 346 described above with reference to FIG. 3B, except that in step 378 it is the third party website 224 that sends the web address of the product webpage 378 to the agent server, rather than the client device 112.

At step 380 the agent server 202 receives the web address of the product webpage from the third party website 222, and the agent server uses the received web address of the product webpage to autonomously visit the product webpage, in the same or a similar manner as was described above with reference to step 348 in FIG. 3B. At step 382, the agent server 202 captures contents of the product webpage associated with the product that the user wants to order, in the same or a similar manner as was described above with reference to step 350 in FIG. 3B. For similar reasons to those discussed above with reference to step 350 in FIG. 3B, an HTML-clone produced by the agent server 202 at step 382 can be referred to as an HTML-clone not including user specified selectables, or more generally, as captured contents of the product webpage not including user specified selectables.

At step 384 the agent server 202 derives product information from the captured contents of the product webpage. The product information can include, e.g., the product title, the product price, the name of the online shop 122 selling the product, and/or the like. The product information can also include information about selectables (e.g., color and size) that the use still needs to select. At step 386, based on the product information that the agent server 202 derives at step 384, the agent server 202 generates and serves a selectables page or pop-up to the client device 112, which enables the user of the client device 112 to specify their selections (e.g., color and size) for the product that the user wants to order. The selectables page or pop-up, served at step 386, preferably also includes the title and price of the product that the user wants to order, and can also include an image (e.g., picture) of the product. The agent server 202 can serve the selectables page or pop-up, via the Internet, directly to the client device 112. The agent server 202 can alternatively serve the selectables page or pop-up, via the Internet, to the third party website 222, and the user of the client device 112 can view and interact with the selectables page or pop-up by interacting with the third party website 222. Either way, at step 390 the user is given the opportunity to specify selectables (e.g., color and size) for the product that the user wants to order.

Still referring to FIG. 3C, at step 392 the user is given the opportunity to login to an account (e.g., using an email address and password) that they have already established with the agent server 202 (via a registration process that the user has already completed), or to register with the agent server 202, in a similar manner as was described above with reference to steps 302-306 in FIG. 3A and steps 332-336 in FIG. 3B. This enables the agent server 202 to identify and/or obtain personal information (e.g., shipping address and payment information) for the user. The sequence of some of these steps may be rearranged. For one example, the user may be required to login or register with the agent server 202 before selecting selectables via the selectables page or pop-up.

At step 394, the selectables information (e.g., color and size) are sent from the client device 112 to the agent server 202 via the Internet 102. For example, there may be a "process order" button, or the like, included on the selectables page or pop-up that causes the user specified selectables information to be sent from the client device 112 (or the third party website 222) to the agent server 202, in a similar manner as was discussed above with reference to step 360 in FIG. 3B. The selectables information can be sent from the client device 112 to the agent server 202 via the Internet 102. Alternatively, if the user views and interacts with the selectables page or pop-up by interacting with the third party website 222, then the third party website 222 can send the selectables information to the agent server 202 via the Internet 102. Either way, at step 396, which is the same or similar to step 362 in FIG. 3B, the agent server 202 receives the user specified selectables information (from the client device 112 or the third party website 222). At step 398, the agent server 202 uses the product information (derived at step 384) and the selectables information (received at step 396) to order the product for the user.

The fact that the user completed steps 390 and/or 392 can be treated as a confirmation that the user wants to order the product. Alternatively, in a similar manner as was discussed above with reference to steps 322 and 324 of FIG. 3A, the agent server 202 can serve a confirmation page or pop-up to the client device 112 (or the third party website 222), which enables the user to confirm, modify or cancel the order. The user can be allowed to select and/or change a shipping address and payment option using the selectables page or pop-up, or using the confirmation page or pop-up. If the product that a user wants to order does not have any selectables (e.g., if the product is offered for sale in only one color and size), certain steps (e.g., 386, 390, 394 and 396) may be skipped.

Additional details of steps 320 and 326 in FIG. 3A, steps 352 and 364 in FIG. 3B, and steps 384 and 398 in FIG. 3C, will be described below with reference to FIG. 5. However, FIG. 4 will first be used to explain exemplary components of the agent server 202.

In the above described embodiments, the downloading of the agent plug-in 212 to the client device 112, and the downloading of the agent application 214 to the client device 112, were generally described as occurring as part of a registration process during which a user utilizes a client device 112 to register with the agent server 202. In alternative embodiments, the agent plug-in 212 or the agent application 214 can be downloaded prior to a user registering with the agent server 202. For example, the agent plug-in 212 or the agent application 214 can be downloaded directly from the agent server 202, or from an app store, in response to a user of a client device 112 requesting such a download. Thereafter, e.g., the first time the user attempts to use the agent plug-in 212 or the agent application 214 installed on their client device 112 to have a product ordered, the agent server 202 can recognize that the user has not yet registered with the agent server 202, and at that time the agent server 202 can serve a registration webpage to the client device 112 of the user. Then, after the user has completed the registration process, the user will be able to utilize the agent plug-in 212 or the agent application 214 to have a product ordered. In other words, instead of the agent plug-in 212 or the agent application 214 being downloaded as part of the user registration process, the user registration process can alternatively occur after the agent plug-in 212 or the agent application 214 has already been downloaded to a client device 112 of the user. Other variations are also possible, and within the scope of the embodiments described herein. Further, it is noted that during the registration process, more than one registration webpage may be served by the agent server 202 to a client device 112, depending upon the specific implementation. In other words, the agent server 202 can serve one or more registration webpages to a client device 112 during a user registration process.

Figure 4:
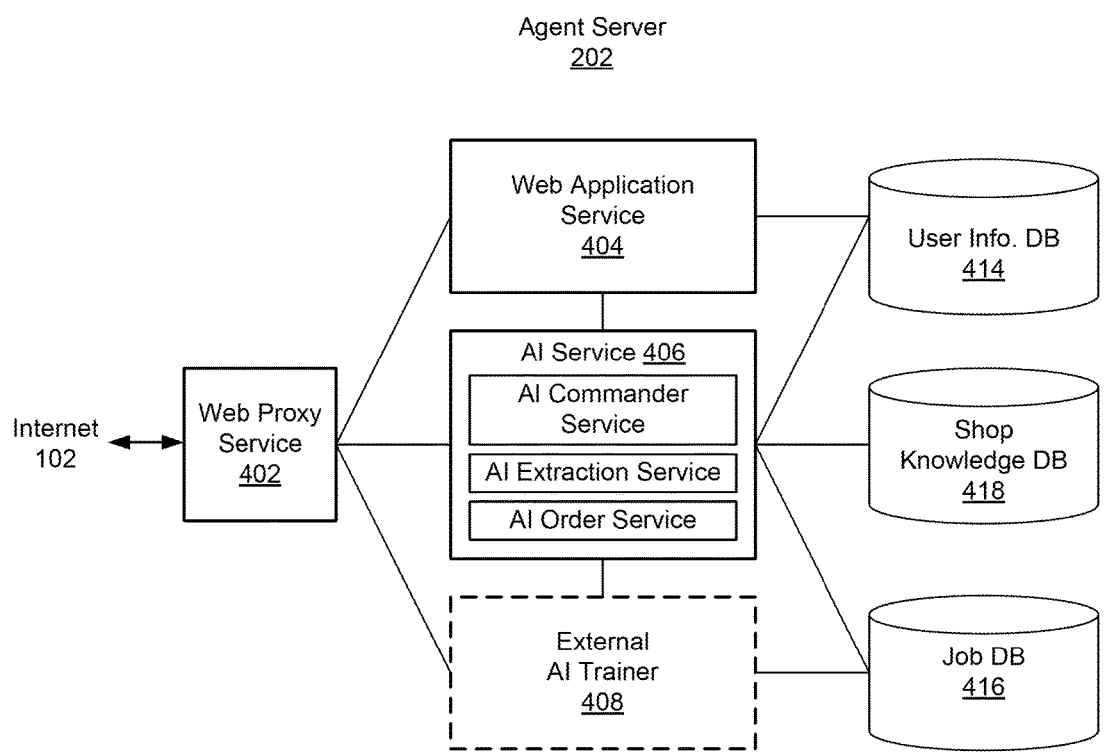
FIG. 4 is a high level block diagram that is used to explain exemplary components of the agent server introduced in FIG. 2.

Referring to the high level block diagram of FIG. 4, the agent server 202, which can also be referred to as the agent system 202, is shown as being separated into a plurality of different computer implemented services, wherein the various services may be supported using one or more hardware processors, software and/or firmware. The agent server 202 can have a server infrastructure that is based on a service oriented architecture in which every service registers itself to a central service directory, and in which every service can discover another service and connect to it in order to create remote procedure calls. Referring to FIG. 4, the agent server 202 is shown as including a web proxy service 402, a web application service 404, and an artificial intelligence (AI) service 406. The various services of the agent server 202 can also be referred to as subsystems of the agent server 202, each of which is computer implemented. The agent server 202 is also shown as having a user information database 414, a job database 416, and a shop knowledge database 418. One or more of the databases (e.g., the shop knowledge database 418), or portions thereof, may by implemented using an online file storage web service. It is also possible that the agent server 202 can have more or less databases than shown. For example, the user information database 414 and the shop knowledge database can be implemented with a single database. Also shown in FIG. 4 is an external AI trainer block 408, which is representative of humans that may be employed to help train the AI service 406, as will be described in additional detail below.

The web proxy service 402 can route incoming web traffic to an appropriate one of the other services. The web proxy service 402 can also serve static websites, such as a landing page for the agent server 202. A firewall, or the like, can be installed between the web proxy service 402 and the AI service 406, to prevent unauthorized access to the AI service 406. In accordance with an embodiment, there can be no direct connection between the web proxy service 402 and the AI service 404, in which case the web proxy service 402 may communicate or otherwise interact with the AI service 406 through the web application service 404. Other variations are possible and within the scope of embodiments described herein.

The web application service 404 can serve user registration webpages, which can be used to obtain personal information from users that register to use the services of the agent server 202. Such personal information, which as explained above can include e.g., the name, address and phone number of the user, a delivery address for the user, payment information for a user, and a user specified password can be stored in the user information database 315, which can also be referred to as the personal information database 315. The personal information that is stored in the user information database 315 is preferably encrypted and cannot be accessed from outside of the agent server 202.

The web application service 404 can also serve dashboard webpages and universal shopping cart webpages to users, exemplary details of which were discussed above. Additionally, the web application service 404 can also serve the confirmation page or pop-up, discussed above, which informs a user that a product will be ordered within a specified amount of time (e.g., 30 minutes), and provides the user with an option (e.g., a cancel button) for canceling an order, and potentially also provides the user with an option (e.g., a confirm button) for affirmatively confirming an order prior to the specified amount of time (e.g., 30 minutes) elapsing. In a specific embodiment, the agent server 202 will only perform the agent process for ordering a product in response to the user affirmatively confirming, e.g., via the confirmation page or pop-up, that the user wants the product ordered.

The web application service 404 can also serve everything that the agent plug-in 212, the agent application 214 and/or the agent application 224 needs to operate. For example, the web application service 404 can cause the agent plug-in 212 or the agent application 214 to be downloaded via the Internet 102 and installed on a client device (e.g., 112) in response to a user registering with the agent server 202.

The AI service 406 can include various types of AI services, including, e.g., an AI commander service, an AI extraction service, and an AI order service, but are not limited thereto. The AI service 406 can order one or more products for a user based on captured contents of a product webpage that is provided to the agent server 202 by a client device (e.g., 112) in response to the user of the client device 112 indicating that they wish to order a product that the user is currently viewing using the web browser 114 of their client device 112. As noted above in the discussion of FIG. 3A, the user can initiate the process of capturing contents of a product webpage, e.g., in response to the user selecting a one-click buy icon, or a universal shopping cart icon, that is provided by the agent plug-in 212. Alternatively, a client device 112 or a third party website 222 can send a web address or a product webpage to the agent server 202, and the agent server 202 can use a web browser (e.g., a headless browser) to visit the product web page and capture contents of the product web page, as was described above with reference to steps 350 and 382 in FIGS. 3B and 3C.

Additional details of steps 320 and 326 in FIG. 3A, steps 352 and 364 in FIG. 3B, and steps 384 and 398 in FIG. 3C, according to specific embodiments of the present technology, will now be described with reference to FIG. 5. The agent process described with reference to FIG. 5 can begin after the agent server 202 obtains captured contents of a product webpage corresponding to a product that a user indicated, using their client device 112 (and/or a third party website 222), that the user wants to order. As explained above, in certain embodiments the captured contents of a product webpage is an HTML-clone of the product webpage. The HTML-clone can be an HTML-clone including user specified selectables that the client device 112 sent to the agent server 202 at step 316 in FIG. 3A. The HTML-clone can alternatively be an HTML-clone that does not include user specified selectables, which the agent server 202 produced at step 350 in FIG. 3B or at step 382 in FIG. 3C. As will be described in further details below, certain steps described with reference to FIG. 5 can be skipped if the agent server 202 has already obtained certain shop knowledge about a specific online shop 122 from which a product is to be ordered. However, during the initial discussion of FIG. 5, it will be assumed that that the agent server 202 does not yet have sufficient shop knowledge to enable any steps to be skipped.

Figure 5:
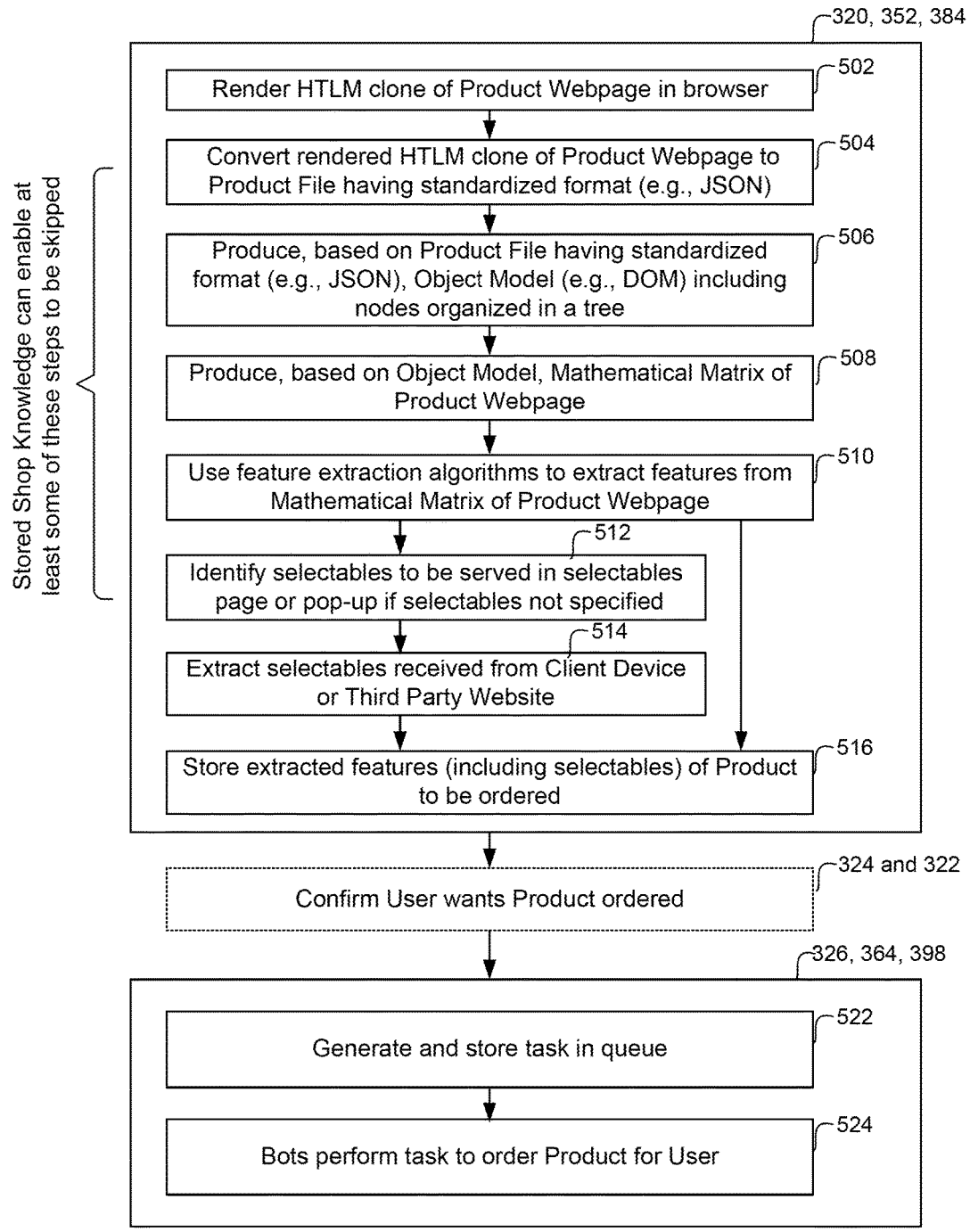
FIG. 5 is a flow diagram that provides additional details of some of the steps introduced in FIGS. 3A, 3B and 3C, according to certain embodiments.

Referring to FIG. 5, at step 502 that AI service 406 renders the HTML-clone of the product webpage in a web browser, which can be a headless web browser, but is not limited thereto. Step 502 is achieved without the actual product webpage (of one of the online shops 122) being revisited at step 502 by the AI service 406, since the HTML clone (received by the agent server 202 at step 318, or produced by the agent server 202 at step 350 or 382) includes sufficient information to enable product webpage to be locally rendered.

At step 504, the rendered HTML-clone of the product webpage is converted by the AI service 406 (e.g., the AI commander service) to a product file having a standardized format, which format will be the same regardless of which online shop 122 is selling the product. In accordance with an embodiment, the standardized format is the JavaScript Object Notation (JSON) format, which is an open standard format that uses human-readable text to transmit data objects consisting of attribute-value pairs, and is the primary data format used for asynchronous browser/server communication. The standardized format can alternatively be Binary JSON (BSON), or YAML, but is not limited thereto. In accordance with an embodiment, both the HTML-clone of a product webpage (used to render the product webpage at step 502) and the product file having the standardized format (e.g., the JSON file) are stored in the shop knowledge data base 418, together with the web address of the product webpage, to enable the HTML-clone and the product file to be accessible at later points in time. Additionally, or alternatively, the HTML-clone of a product webpage and/or the product file having the standardized format (e.g., the JSON file) are stored in file storage, e.g., in an online file storage web service, such as Amazon Simple Storage Service (Amazon S3™), but is not limited thereto. At step 506, the AI service 406 produces, based on the product file having the standardized format (e.g., the JSON file) that was produced at step 504, an object model including nodes organized in a tree structure, wherein objects in the tree structure can be manipulated using methods on the objects. The object model produced at step 506 can be, e.g., a Domain Object Model (DOM), or a DOM like structure, but is not limited thereto. For an example, in the object model, if the product webpage is an HTML document, then the entire HTLM document can be a document node, every HTML element (e.g., the body, the anchor, the headings (e.g., H1, H2, etc.)) can be an element node, the text in the HTML elements can be text nodes, every HTML attribute can be an attribute node, and comments can be comment nodes At step 508, the AI service 406 uses the object model corresponding to the product webpage (produced at step 506) to produce a mathematical matrix corresponding to the product webpage. In other words, at step 508 the object model (including nodes organized in a tree structure) corresponding to the product webpage is translated, by the AI service 406, into a mathematical matrix. Each row in the mathematical matrix can represent a node in an HTML document corresponding to the product webpage, and each column in the mathematical matrix can represent a feature within a node. Exemplary features are node attributes, such as: tagName=body, class=class, id=id, text=ABC, etc. This can be better explained by way of the following example, wherein the below text corresponds to exemplary text of a portion of an HTML document that was cloned (at step 314, 350 or 382) to produce an HTML-clone:

| 51 | <body class="good-looking" id="main-body">ABC |
| 52 | <div class="color-container"> |
| 53 | ... |
| 54 | </div> |
| 55 | </body> |

An exemplary portion of a corresponding mathematical matrix, that can be produced at step 508, is shown below:

| tagName | class | id | text |
|---------|-------|-----|------|
| body | good-looking | main-body | ABC |
| div | color-container | | |

Still referring to FIG. 5, at step 510 the AI service 406 (e.g., the AI extraction service) performs extraction algorithms to extract product features (of the product to be ordered) from the mathematical matrix. Exemplary product features that can be extracted include product title, product price, product brand, size, color, etc. The extracted features can be used to expand the mathematical matrix by the probabilities for every node to be a particular feature. For a specific example, calculations can be performed to determine the probability that each node is a color, and the mathematical matrix can be expanded by adding a column (e.g., an "isColor" column) that includes, for each node, a probability that the node is a color. Continuing with the example introduced above, an example of the mathematical matrix expanded to include an "isColor" column, is shown below:

| tagName | class | id | text | isColor |
|---------|-------|-----|------|---------|
| body | good-looking | main-body | ABC | 0 |
| div | color-container | | | 0.2 |

Where the HTML-clone rendered at step 502 includes user specified selectables (e.g., a user selected color and size), then user specified selectables can be determined as part of the feature extraction process performed at step 510. Where the HTML-clone rendered at step 502 does not include user specified selectables, then the extracted features can be used to identify selectables that still need to be specified by the user. More specifically, at step 512, not yet specified selectables can be identified and used to serve the selectables page or pop-up that is served to the client device 112 or the third party website 222, e.g., at step 354 (in FIG. 3B) or step 386 (in FIG. 3C).

At step 514 the AI service 406 extracts features from the selectables information received from the client device 112 or the third party website 222, at which point the AI service 406 should have extracted or otherwise obtained all of the product features that will enable the AI service 406 to order the product for the user. Step 514 in FIG. 5 can utilize information received by the agent server 202 at steps 362 and 386 in FIGS. 3B and 3C.

At step 516 the extracted features (included extracted or otherwise obtained selectables information) corresponding to a product webpage are stored, e.g., in the shop knowledge database 418. The extracted features can be stored together with the web address (e.g., URL) of the product webpage, to enable the extracted features to be accessible at later points in time.

Still referring to FIG. 5, in certain embodiments described above, the agent server 202 does not attempt to order a product for a user until receiving confirmation from the user. Exemplary ways that confirmation can be received or otherwise obtained from a user were discussed above with reference to FIGS. 3A, 3B and 3C, and thus need not be repeated here. In FIG. 5, the dotted lined block labeled 324 and 322 is representative of the agent server 202 receiving or otherwise obtaining a confirmation that the product should be ordered for the user.

At step 522, after the AI service 202 has confirmed that a product should be ordered for a user, the AI service 202 stores a task corresponding to the product to be ordered for the user in the job database 416, which can alternatively be referred to as the task database. In an embodiment, the job database 416 provides a queue of tasks that are to be executed in order for the agent server 202 to complete the agent process associated with ordering products for users.

At step 524, tasks in the queue may then be executed by at least one order bot program. Preferably, the tasks associated with orders are executed by a number of order bot programs in parallel. More generally, at step 524 bots of the AI service 406 (e.g., of the AI order service) select tasks from the job database 416 and autonomously perform the steps necessary to order the product for the user. Such an order bot program can control the ordering a product via a web interface of the agent server 202 by imitating human interaction, wherein, artificial intelligence and the potentially also contents of the shop knowledge database may be used.

In accordance with an embodiment, the AI service 406 uses the web address (e.g., URL) from an HTML-clone that includes user specified selectables to load a webpage from the specific online shop 122 that corresponds to the specific product that the user wants ordered, and the AI service 406 produces an HTML-clone that does not include user specified selectables. In other words, steps 502-508 can be performed (e.g., in parallel) for both an HTML-clone that includes user specified selectables, and an HTML-clone that does not include user specified selectables. As part of its feature extraction process, at step 510, the AI service 406 can compare extracted features from the HTML-clone that includes user specified selectables to extracted features from the HTML-clone that does not include user specified selectables, to identify differences therebetween, with the differences likely including or corresponding to the user specified selectables. This is just one of many different techniques that the AI service 406 can use to identify selectables (e.g., color and size) that were selected by the user.

Methods of artificial intelligence that are used by the AI service 202 may include heuristic rules and/or supervised learning. For example, a bot can learn the product description for an online store 122 by using heuristics which exploit the regularities typically present in webpages of the online store 122. These heuristics strongly direct the learning process according to these regularities. These heuristics may assume, e.g., that a product description includes a digital image of the product, wherein the product identification (product name) can be found somewhere in the immediate proximity of the image. The heuristics may divide the HTML code of each webpage into logical portions representing groups of related information. Further, the heuristics may assume that every product sold by a specific online store 122 is described in the same format. Product attributes can be categories relevant for describing products. The product attributes can generally be product category-dependent (e.g., CDs or DVDs have different product attributes than shoes, computers, or TV sets). The heuristics for understanding webpages of a particular online shop 122, or online shops 122 in general, may recognize the typical terminology used in respective product categories. Rules may be used whose antecedents match typical words used to describe input fields on product-related query forms and whose consequents specify which product query attributes are filled in by the user or have to be filled in by the bot into the respective input fields. For example, such heuristics can recognize the words "product category" or "description" or "part number" as possibly identifying the product actually presented to the user. Words like "size", "color", "quantity", "name", "address", "credit card number" can possibly identify input fields for product attributes, shipping address, or payment details, respectively.

More generally, as part of step 510 the AI service 406 can label various details of product webpages. For example, bots of the AI service 406 (the AI extraction service) can utilize spider algorithms to label various details of a product webpage, in order to obtain shop knowledge that enables the AI service 406 to thereafter more efficiently order products for users. These bots can utilize web scraping technologies, artificial intelligence and machine learning principles to learn human activities and automate their execution. Labels that the AI service 406 may specify for various details of a product webpage can include, e.g., this is the product title, this is the product price, this is the drop down menu for selecting color, this is the drop down menu for selecting size, this is the indicator of product availability, this is the add to shopping cart button, this is the go to checkout button, and/or the like. The AI service 406 can similarly label details of various checkout webpages. Labels that the AI service 406 may specify for various details of check out webpages can include, e.g., this is the first name field, this is the last name field, this is the billing address field, this is the shipping address field, this is the drop down menu for selecting a state, this is the drop down menu for selecting a country, this is the filed for entering a zip code, this is the button for proceeding to the next checkout webpage, this is the button for confirming an order, and/or the like. The various labels, described above, along with specific URLs and other information derived from HTLM-clones can be stored in the shop knowledge database 418. The information in the shop knowledge database can be used by the AI service 406 to autonomously perform checkout processes, as well as to test and train the AI service 406.

The above discussed labeling can be used during an ordering and checkout procedure during which the AI service 406 uses bots (also known as Internet bots, or web robots) to order the product for the user at step 524. Such bots, which are intelligent software programs, can utilize a web browser (e.g., a headless browser) running on the agent server 202 to emulate the process of a human making appropriate configuration selections, selecting appropriate buttons (e.g., checkout buttons, verify buttons, or the like) and populating appropriate fields with personal information (e.g., the name, address and phone number of the user, a delivery address for the user and payment information) for a user, in order to automate the process of ordering the product for the user.

In accordance with an embodiment, where an online shop 122 requires that an account be created before a product is ordered, bots of the AI service 406, and more generally the agent server 202, can autonomously create an account for a user, without the user being aware of the account and without involving the user. This can include a bot entering personal information corresponding to a user into a registration webpage associated with the online shop 122. This can also include the bot creating and entering a password of which the user is unaware. Bots can obtain such personal information for a user from the user information database 414. After creating an account for a user, account information, including a password created and used for the user for a specific online shop 122, can be stored in the user information database 414. This way the agent server 202 can use that same agent server generated user account and user password in the future, if the same user, at a later point in time, wants to use that agent server 202 to order another product from the same online shop 122.

It is noted that in the above described example, it was the agent server 202 that created an account for the user, not the user him/herself. Accordingly, in the above described example, the agent server 202 still orders a product for a user from a particular online shop 122 without requiring that the user create an account with the particular online shop. This is not to say that a user may not have, on their own, previously created an account with the particular online shop. However, in such a case, the agent server 202 need not be aware of the user having created their own account with the particular online shop, and the agent server 202 need not utilize the account created by the user him/herself.

In a specific embodiment, a user can provide the agent server 202 with information about accounts they have already created with specific online shops, e.g., in order for the user to obtain certain benefits (e.g., such as free and/or expedited shipping) that the user is provided with for having created and potentially have paid for a premium account. The user can provide such information to the agent server when the user registers with the agent server 202, or when the user confirms an order, but is not limited thereto. This way, when the agent server 202 orders a product for a user from an online shop 122 that the user has already created an account with, the agent server 202 can utilize the account the user has created. Nevertheless, even in this most recent example, there was still no requirement that the user had created an account with the particular online shop. Rather, if the user had happened to already have done so, the agent server 202 may utilize the user's personal account if the user authorizes the agent server 202 to do so.

In most cases, the AI service 406 will be able to successfully order a product for a user by utilizing the HTLM-clone that it receives from a client device 112 and using labels that the AI service 406 specifies. However, on rare occasions, the AI service 406 may be initially unable to autonomously successfully order a product for a user. In such cases, the HTLM-clone can be used to load the product webpage on a web browser including a GUI that is manned by a human. In such a case, the human can manually enter specific information and/or select specific configuration options and/or buttons that cause the order to be completed. Such a human could be employed or contracted by the company supporting the agent service 202. The human can additionally assist in labeling various details of a product webpage and/or checkout webpages, to help train the AI service 406, so that the next time the AI service 406 visits the same (or a similar) product webpage and/or checkout webpages, the AI service 406 can completely automate the ordering process. In accordance with an embodiment, the human is not given any access to personal information, but rather helps label various details so that once the details are labeled, the AI service 406 can try again to automate the process of ordering a product for a user using new information provided to the AI service 406 by the human. In such an embodiment, the human is an example of an external AI trainer 408.

An external AI trainer 408 may be allowed to name their own labels so as to help build a library of terms to include in the shop knowledge database 418. For example, an external AI trainer may view a product webpage that includes a standard-price that is struck-through and next to which is a new "offer-price". If a label does not yet exist for a new offer price, the external AI trainer can specify their own label and name it as they like, e.g., as "reduced price". Other external AI trainers that view the same (or similar) product webpage may add a label "offer price" or "angebotspreis" (which is the German word for "offer price"). The AI service 406 can determine that the three different labels "reduced price", "offer price" and "angebotspreis" are all synonymous labels, and can map all three of these different labels to a common label, e.g., "offer price". This way the AI service 406 can learn synonyms, and even different languages, over time.

The AI service 406 can use bots to populate the shop knowledge database 418 with data (e.g., metadata) extracted from HTML-clones of webpages associated with various online shops 122. The shop knowledge database 418 can store knowledge obtained for each different online shop 122 from which the AI service 406 has ordered products or otherwise obtained shop knowledge. For example, the AI service 406 can associate the knowledge it obtains from each different online shop 122 with the URL of the online-ship 122, since each online shop 122 should have its own unique URL. The shop knowledge database 418 can also store data (e.g., metadata) extracted by external AI trainers 408. Further, external AI trainers 408 may be used to correct data that had been extracted by bots, if it is determined that data autonomously extracted by bots were inaccurate.

Referring again to FIG. 5, at step 524 the AI service 406 can use bots to autonomously navigate to a product webpage (corresponding to a product the user wants to order) and select and/or enter user specified selectables for a product (as learned from the HTML-clone). Additionally, the bots can autonomously add one or more products to a shopping cart affiliated with the particular one-line shop 122 (from which the user indicated they want to order the product), navigate to the shopping cart and checkout webpages affiliated with the particular online shop 122, and complete the transaction of ordering the product for the user from the particular online shop 122.

In accordance with certain embodiments, one or more steps described with reference to FIG. 5 can be eliminated where the agent server 202 has already obtained shop knowledge for a specific online shop 122 from which a user has indicated that they want to order a product. This is because an individual online shop 122 will typically use the same page layout for most, if not all, of their product webpages. Additionally, an individual online shop 122 will often use the same checkout webpages that have the same layout and occur in the same sequence. For a more specific example, once the agent server 202 has obtained and stored shop knowledge for Amazon.com™ that specifies the layout of product webpages, and specifies the layout and sequence of the checkout webpages, the agent server 202 may be able to jump directly from step 502 in FIG. 5 to step 516, or directly from step 502 to 512 in FIG. 5 (where selectables still need to be specified by the user). In accordance with an embodiment, the agent server 202, after receiving or producing an HTML-clone of a product webpage, can first check to see if the shop knowledge it has stored is sufficient to enable the AI service 406 to extract features from the HTML-clone that are sufficient to order the product for the user. If the agent server 202 is not able to rely on shop knowledge, then the agent server 202 can thereafter perform the more computationally intensive steps (e.g., steps 504 through 510) to extract features that are need to order the product for the user.

The subject matter described herein may be embodied in systems, apparatus, methods, and/or articles depending on the desired configuration. In particular, various implementations of the subject matter described herein may be realized in computer software, firmware or hardware and/or combinations thereof, as well as in digital electronic circuitry, integrated circuitry, and the like. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs), but not limited thereto) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, certain the subject matter described herein may be implemented on a computer having a display device (e.g., a cathode ray tube (CRT) or liquid crystal display (LCD) monitor, but not limited thereto) for displaying information to the user and a keyboard, touch screen and/or a pointing device (e.g., a mouse, touchpad or a trackball, but not limited thereto) by which the user may provide input to the computer. Other kinds of devices may be used to provide for interaction with a user, administrator and/or manager as well; for example, feedback provided to the user, administrator and/or manager may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface (GUI) or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include, but are not limited to, a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

While various embodiments of the present invention have been described above, it should be understood that they have been presented by way of example, and not limitation. It will be apparent to persons skilled in the relevant art that various changes in form and detail can be made therein without departing from the spirit and scope of the invention. For example, although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flow depicted in the accompanying figures and/or described herein do not require the particular order shown, or sequential order, to achieve desirable results. Other embodiments may be within the scope of the following claims.

Embodiments of the present invention have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

The breadth and scope of the present invention should not be limited by any of the above-described exemplary embodiments, but should be defined only in accordance with the following claims and their equivalents.

What is claimed is:

1. A method for simplifying ordering from online shops accessible via the Internet, the method comprising:
    an agent server receiving, from a client device, captured contents of a product webpage that are captured in response to a user of the client device using a web-browser plug-in to indicate that that the user wants to order a product that is at least one of shown or described on the product webpage, wherein the product webpage is one of a plurality of webpages of a website that is hosted by or on behalf of an online shop, and wherein the product that the user indicated that the user wants to order is at least one of a good or a service that is offered by the online shop;
    the agent server autonomously deriving product information from the captured contents of the product webpage received from the client device, wherein the product information is indicative of the product that the user indicated that the user wants to order from the online shop; and
    the agent server, using the derived product information, autonomously controlling ordering of the product for the user from the online shop, without requiring that the user have an account with the online shop, without requiring that the user enter personal and payment information in a check-out webpage of the online shop, without requiring that the user initiate a buy, shopping cart, or check-out process on the website that is hosted by or on behalf of the online shop, and without requiring that the online shop utilize an application program interface (API) to enable the agent server to interact with the online shop.

2. The method of claim 1, further comprising, prior to the agent server receiving the captured contents of the product webpage from the client device:
    providing a web-browser plug-in to the client device that enables the user of the client device to utilize the agent server, remote from the client device, to order one or more products for the user from any one of a plurality of different online shops, without requiring that the user have an account with any of the plurality of different online shops, without requiring that the user enter personal and payment information in a check-out webpage of any of the plurality of different online shops, without requiring that the user initiate a buy, shopping cart, or check-out process on a website that is hosted by or on behalf of any of the plurality of different online shops, and without requiring that any of the plurality of different online shops utilize an API that enables the agent server to interact with the online shops.

3. The method of claim 1, wherein:
    the product webpage comprises an HTML document;
    the captured contents of the product webpage, that are received by the agent server, comprise a clone of the HTML document; and the product information, that is derived by the agent server, is derived from the clone of the HTML document.

4. The method of claim 3, wherein:
the HTML document, that the product webpage comprises, includes one or more user selections, selected by the user, that specify one or more configurations of the product that the user indicated that the user wants to order; and
the clone of the HTML document includes information indicative of the one or more user selections, selected by the user, that specify the one or more configurations of the product that the user indicated that the user wants to order.

5. The method of claim 3, wherein the deriving product information from the captured contents of the product webpage, includes:
converting the clone of the HTML document to a product file having a standardized format;
producing, based on the product file having the standardized format, an object model including nodes organized in a tree;
producing, based on the object model, a mathematical matrix corresponding to the product webpage; and
extracting features corresponding to the product information from the mathematical matrix.

6. The method of claim 1, wherein the agent server controlling ordering of the product for the user includes:
storing, in a job database of the agent server, job information that includes the product information derived from the captured contents of the product webpage and user information associated with the user that wants to order the product; and
automating ordering of the product that the user indicated that the user wants to order using one or more bots running on the agent server, which access the job information from the job database, and using a web-browser running on the agent server;
wherein the web-browser running on the agent server can be a headless browser.

7. The method of claim 1, wherein the agent server utilizes artificial intelligence (AI) to autonomously derive at least a portion of the product information from the captured contents of the product webpage.

8. The method of claim 1, wherein the agent server utilizes previously obtained online shop knowledge to autonomously derive at least a portion of the product information from the captured contents of the product webpage.

9. An agent server configured to simplify ordering of products from online shops via the Internet, the agent server comprising:
a web proxy service configured to receive, from a client device, captured contents of a product webpage that are captured in response to a user of the client device using a web-browser plug-in to indicate that that the user wants to order a product that is at least one of shown or described on the product webpage, wherein the product webpage is one of a plurality of webpages of a website that is hosted by or on behalf of an online shop, and wherein the product that the user indicated that the user wants to order is at least one of a good or a service that is offered by the online shop;
an artificial intelligence (AI) service configured to autonomously derive product information from the captured contents of the product webpage received from the client device, wherein the product information is indicative of the product that the user indicated that the user wants to order from the online shop; and
the AI service also configured to use the derived product information to autonomously control ordering of the product for the user from the online shop, without requiring that the user have an account with the online shop, without requiring that the user enter personal and payment information in a check-out webpage of the online shop, without requiring that the user initiate a buy, shopping cart, or check-out process on the website that is hosted by or on behalf of the online shop, and without requiring that the online shop utilize an application program interface (API) to enable the agent server to interact with the online shop.

10. The agent server of claim 9, wherein:
the product webpage comprises an HTML document, the captured contents of the product webpage that are received by the web proxy service comprise a clone of the HTML document, and the product information that is derived by the AI service is derived from the clone of the HTML document; and
the AI service is configured to autonomously derive product information from the captured contents of the product webpage, by converting the clone of the HTML document to a product file having a standardized format, producing an object model including nodes organized in a tree from the product file having the standardized format, producing a mathematical matrix corresponding to the product webpage from the object model, and extracting features corresponding to the product information from the mathematical matrix.

11. A method for simplifying ordering from online shops accessible via the Internet, the method comprising:
an agent server receiving, from a client device or a third party website that is visited by a user using the client device, a web address corresponding to a product webpage for a product that the user wants to order from an online shop;
the agent server autonomously using a web browser to visit the received web address corresponding to the product webpage for the product that the user wants to order from the online shop;
the agent server autonomously capturing contents of the product webpage;
the agent server autonomously deriving product information from the captured contents of the product webpage, wherein the product information is indicative of the product that the user indicated that the user wants to order from the online shop; and
the agent server, using the derived product information, autonomously controlling ordering of the product for the user from the online shop, without requiring that the user have an account with the online shop, without requiring that the user enter personal and payment information in a check-out webpage of the online shop, without requiring that the user initiate a buy, shopping cart, or check-out process on a website that is hosted by or on behalf of the online shop, and without requiring that the online shop utilize an application program interface (API) to enable the agent server to interact with the online shop.

12. The method of claim 11, further comprising:
the agent server autonomously identifying, from the captured contents of the product webpage, selectables associated with the product that the user indicated that the user wants to order from the online shop;

the agent server autonomously serving a selectables page or pop-up that enables the user to specify the selectables associated with the product;

the agent server receiving selectables information and deriving therefrom product information corresponding to the selectables; and the agent server using the derived product information corresponding to the selectables when autonomously controlling the ordering of the product for the user from the online shop.

13. The method of claim 11, further comprising, prior to the agent server receiving the web address corresponding to the product webpage for the product that the user wants to order from the online shop:

providing an agent application to a client device that enables a user of the client device to utilize the agent server, remote from the client device, to order one or more products for the user from any one of a plurality of different online shops, without requiring that the user have an account with any of the plurality of different online shops, without requiring that the user enter personal and payment information in a check-out webpage of any of the plurality of different online shops, without requiring that the user initiate a buy, shopping cart, or check-out process on a website that is hosted by or on behalf of any of the plurality of different online shops, and without requiring that any of the plurality of different online shops utilize an API that enables the agent server to interact with the online shops;

wherein the agent application is configured to cause a web address corresponding to a product webpage to be sent from a client device, on which the agent application is installed, to the agent server in response to the client device being used to share the web address of the product webpage with the agent application.

14. The method of claim 11, further comprising, prior to the agent server receiving the web address corresponding to the product webpage for the product that the user wants to order from the online shop:

providing an agent application to a third party website that enables a user of a client device to utilize the agent server, remote from the client device, to order one or more products for the user from any one of a plurality of different online shops that sell products which are displayed on or otherwise linked to by the third party website, without requiring that the user have an account with any of the plurality of different online shops, without requiring that the user enter personal and payment information in a check-out webpage of any of the plurality of different online shops, without requiring that the user initiate a buy, shopping cart, or check-out process on a website of any of the plurality of different online shops, and without requiring that any of the plurality of different online shops utilize an API that enables the agent server to interact with the online shops;

wherein the agent application is configured to cause a web address corresponding to a product webpage to be sent from a third party website, on which the agent application is installed, to the agent server in response to the third party website being used to share the web address of the product webpage with the agent application.

15. The method of claim 11, wherein:
the product webpage comprises an HTML document;
the captured contents of the product webpage, that are received by the agent server, comprise a clone of the HTML document; and the product information, that is derived by the agent server, is derived from the clone of the HTML document.

16. The method of claim 15, wherein the deriving product information from the captured contents of the product webpage, includes:

converting the clone of the HTML document to a product file having a standardized format;

producing an object model including nodes organized in a tree from the product file having the standardized format;

producing a mathematical matrix corresponding to the product webpage from the object model; and extracting features corresponding to the product information from the mathematical matrix.

17. The method of claim 11, wherein the agent server utilizes artificial intelligence (AI) to derive at least a portion of the product information from the captured contents of the product webpage.

18. The method of claim 11, wherein the agent server utilizes previously obtained online shop knowledge to derive at least a portion of the product information from the captured contents of the product webpage.

19. An agent server configured to simplify ordering of products from online shops via the Internet, the agent server comprising:

a web proxy service configured to receive, from a client device or a third party website that is visited by a user using the client device, a web address corresponding to a product webpage for a product that the user wants to order from an online shop;

an artificial intelligence (AI) service configured to autonomously use a web browser to visit the web address corresponding to the received product webpage for the product that the user wants to order from the online shop;

the AI service configured to autonomously capture contents of the product webpage that is autonomously visited;

the AI service configured to autonomously derive product information from the captured contents of the product webpage, wherein the product information is indicative of the product that the user indicated that the user wants to order from the online shop; and the AI service configured to use the derived product information to autonomously control ordering of the product for the user from the online shop, without requiring that the user have an account with the online shop, without requiring that the user enter personal and payment information in a check-out webpage of the online shop, without requiring that the user initiate a buy, shopping cart, or check-out process on the website that is hosted by or on behalf of the online shop, and without requiring that the online shop utilize an application program interface (API) to enable the agent server to interact with the online shop.

20. The agent server of claim 19, wherein:
the product webpage comprises an HTML document, the captured contents of the product webpage that are received by the web proxy service comprise a clone of the HTML document, and the product information that is derived by the AI service is derived from the clone of the HTML document;

the AI service is configured to deriving product information from the captured contents of the product webpage, by converting the clone of the HTML document to a product file having a standardized format, producing an object model having nodes organized in a tree from the product file having the standardized format, producing a mathematical matrix corresponding to the product webpage from the object model, and extracting features corresponding to the product information from the mathematical matrix.

\* \* \* \* \*